US005413448A

United States Patent [19]

Peshkin

[11] Patent Number: 5,413,448

[45] Date of Patent: May 9, 1995

[54] SYSTEM FOR COLLECTION OF MATERIALS FROM A MOVING VEHICLE

[76] Inventor: Donald A. Peshkin, 82 Roger Dr., Port Washington, N.Y. 11050

[21] Appl. No.: 63,644

[22] Filed: May 20, 1993

[51] Int. Cl.[6] .......... B65G 67/02

[52] U.S. Cl. .......... 414/338; 414/343; 414/406; 414/502; 414/679

[58] Field of Search .......... 414/338, 265, 343, 345, 414/347, 389, 401, 406, 407, 409, 502, 512, 517, 521, 523, 611, 679, 525.1

[56] References Cited

U.S. PATENT DOCUMENTS

| | | | |
|---|---|---|---|
| 677,424 | 7/1901 | Owen | 414/345 X |
| 3,189,286 | 6/1965 | O'Connor | 414/407 X |
| 3,576,265 | 4/1971 | Brady et al. | 414/338 |
| 3,845,868 | 11/1974 | Myers | 414/338 |
| 3,921,839 | 11/1975 | herpich | 414/406 X |
| 5,096,354 | 3/1992 | Wu | 414/338 X |
| 5,252,020 | 10/1993 | Kinney et al. | 414/343 X |

FOREIGN PATENT DOCUMENTS

| | | | |
|---|---|---|---|
| 2455791 | 8/1976 | Germany | 414/406 |
| 1655867 | 6/1991 | U.S.S.R. | 414/406 |

*Primary Examiner*—David A. Bucci

[57] ABSTRACT

This is a waste collection system from individual homes by use of a divided garbage can, cantilvered from a mobile supporter which is rolled to curbside and secured to in-ground anchors. A divided collecting device (hereafter called "CD") is suspended on the side of a garbage truck. The moving truck passes the CD beneath the can. Both the can and CD have guides to align themselves with one another. The CD has a mechanism that when touched by the can, causes its top to slide open. The CD engages targets that project downward from beneath the can. It pushes the targets and thereby slides the can's bottom open. It simultaneously compresses a spring beneath the can. Garbage falls from both compartments of the can onto the divided CD. The truck continues to move, the targets disengage, the compressed spring is released and closes the bottom of the can. The top of the CD closes and a sweeper inside the CD stradling the divider rams the garbage backward onto a closed pan. A revolving sweeper within the pan turns the garbage 90 degrees onto a secondary conveyor (hereafter called "SC"). The SC and attached devices are mounted on the back of the truck. A sweeper pulls the garbage through the SC where it falls through chutes into the truck's enclosed hopper. When the CD and attached devices are not being used, they may be hoisted to the top of the truck or otherwise stored.

9 Claims, 23 Drawing Sheets

SYSTEM FOR COLLECTION OF MATERIALS FROM A MOVING VEHICLE

BACKGROUND OF THE INVENTION

1. Field of the Invention

This invention relates to the sorting, storing, discharge and collection of refuse from individual homes by use of a specially designed garbage can. The can is used in conjunction with a garbage truck on which is mounted special equipment that is complementary to the can. There are many kinds of refuse containers but this is the only system that makes it possible to store, either unsorted or sorted refuse, and collect the refuse while keeping it sorted, and cause it to be discharged onto a moving refuse collection vehicle.

It is not unusual for a refuse trucks to be used for eight hours per day, six days per week. With existing procedures, these twenty-five ton trucks stop and start between three hundred and one thousand residences each day. There is a significant amount of energy expended in order to accelerate these vehicles and a corresponding amount of energy used by over twenty-five thousand garbage trucks in the United States, to bring these vehicles to a stop. A significant amount of labor is also used in order to accomplish the task of refuse collection. Present procedures are expensive, they consume large amounts of energy, they pollute the atmosphere, they result in injuries to laborers and they are generally unsanitary. There is need for a system that eliminates the need to stop a garbage truck while refuse is being collected and eliminates the necessity to manually handle, lift and dump refuse into a garbage truck.

2. Description of Prior Art

Garbage is typically, put into a small kitchen can and later transferred into a larger garbage can stored outside the house. (Patents of interest are U.S. Pat. Nos. 4,905,853 to Strawder (1989) and U.S. Pat. No. 4,860,910 to Zipper (1988), U.S. Pat. No. 4,860,909 to Leumi (1988) and U.S. Pat. No. 4,940,159 to Callas (1989). The garbage can is periodically moved to curbside (Patent of interest is U.S. Pat. No. 5,000,467 to Becca) and a refuse collection vehicle, together with its work crew, is brought to each residence. (A patent of interest is U.S. Pat. No, 4,113,214 to Dubois (1977)). The vehicle stops, the can is uncovered, lifted and carried to the truck's hopper and emptied. The garbage can is returned to its original location and recovered, The truck and crew, having completed their assignment, leave. The trucks consume considerable amount of fuel. People doing the work are exposed to noxious odors. They suffer from strain and over exertion and they are often injured, when they inadvertently come in contact with unsanitary materials being collected.

In recent years, efforts have been made to recycle refuse. There are garbage districts that require that different kinds of garbage be segregated from one another. Most companies that collect refuse accomplish at least part of this chore by making extra trips to each home, Some trucks have divided compartments to hold different types of garbage, In general, the procedures outlined are primitive and expensive.

There is need for a system that aids recycling and provides a speedy, efficient and inexpensive method of collecting both sorted and unsorted refuse using a garbage truck. This system greatly increases the speed of refuse collection by eliminating the necessity to stop in order to collect garbage. It also elimates the necessity for human contact with refuse and its odors. The garbage system and its component parts, as presented by the inventor and disclosed in the above-identified patent application, is the first system that provides a comprehensive method that fosters the division of refuse, facilitates recycling, eliminates the need for human contact with refuse and its odors, and significantly reduces the amount of human power and mechanical energy expended to collect refuse. The reduction in energy consumption results from the elimination of the need to start, accelerate, decelerate and stop the garbage truck at each home, from the reduction in time during which the truck's motor is in use and the reduction in the number of trips needed to collect sorted garbage. Another factor that speeds the collection, is the elimination of the necessity to uncover, lift, tip over, return the can to the ground or recover the garbage can. All the foregoing factors reduce fuel consumed and the emmissions given off by the truck during the course of refuse collection thereby protecting the environment against pollution.

SUMMARY OF THE INVENTION

There is need for this system because the system:

a. reduces amount of fuel needed to complete a route,
b. reduces exhaust emissions given off by garbage trucks while garbage is being collected,
c. significantly reduces the cost to collect refuse,
d. facilitates sorting garbage for the purpose of recycling,
e. facilitates moving the refuse container,
f. permits the refuse collection vehicle, while continuously moving forward, to automatically open, empty and close refuse containers, collect the garbage and efficiently complete its route,
g. eliminates contact injuries to employees,
h. eliminates injuries that result from overexertion, and it,
i. minimizes manual labor needed to perform the job.

The system has: 1) a specially designed garbage can that can be automatically opened, emptied and closed, 2) a divisable can that makes it possible to hold two types of sorted garbage at the same time, 3) a bottom plate with a power means that slides the plate from beneath the can and a power means to return the plate to its closed position, 4) a mobile supporter to Support the can in a cantilevered position, to facilitate the can being moved from one location to another and to make it possible to empty the can without it being turned over or removed from the supporter, 5) anchor keys to attach the can to an in gound anchor, 6) anchors to hold the container in a precise location, 7) tracks on the can and supporter to make horizontal alignment possible, 8) guides on the can and collection device to facilitate the horizontal alignment of the can with the collection device, 9) guides and a collar on the mobile supportor to facilitate the verticle alignment of the can with a collection device, 10) a divisable collection device mounted on a collection vehicle that simultaneously collects two kinds of refuse, 11) a power means to push materials toward the rear of the garbage truck, 9) power means that move various components of the system, 12) limit and delay switches, 13) a powered rotating sweeping member that changes the direction that the garbage is being moved, 14) a hollow divided cylindrical device (referred to as a pan), 15) a restrictive gate, 16) flexible barriers, 17) a comb, 18) a divided secondary conveying device with a power means to move and elevate the refuse above the rim of the truck's hopper, 19) a chute assembly consisting of two chutes that direct garbage to the proper place in the hopper including a chute that may be varied as to its length, 20) a universal hopper enclosure which contains refuse and its odors while it is in the hopper of a collecting vehicle, 21) a power means to lift the collection device and the attached part of the pan to the top of a collecting vehicle when the device is not in use and to lower it for use, and 22) a dust chute that collects dust and debris that might be left in the part of the pan attached to the collection device, as the pan and collection device are lifted to the top of the collecting vehicle and turned on its side.

BRIEF DESCRIPTION OF THE DRAWINGS

The invention is made up of a unique combination of elements, construction and arrangement of parts that will be exemplified in the explanation and construction that are set forth in this application. For a fuller understanding of the nature and objects of the invention, reference should be made to the details in the accompanying drawings.

DETAILED DESCRIPTION OF THE PREFERRED EMBODIMENTS

Figure 1:
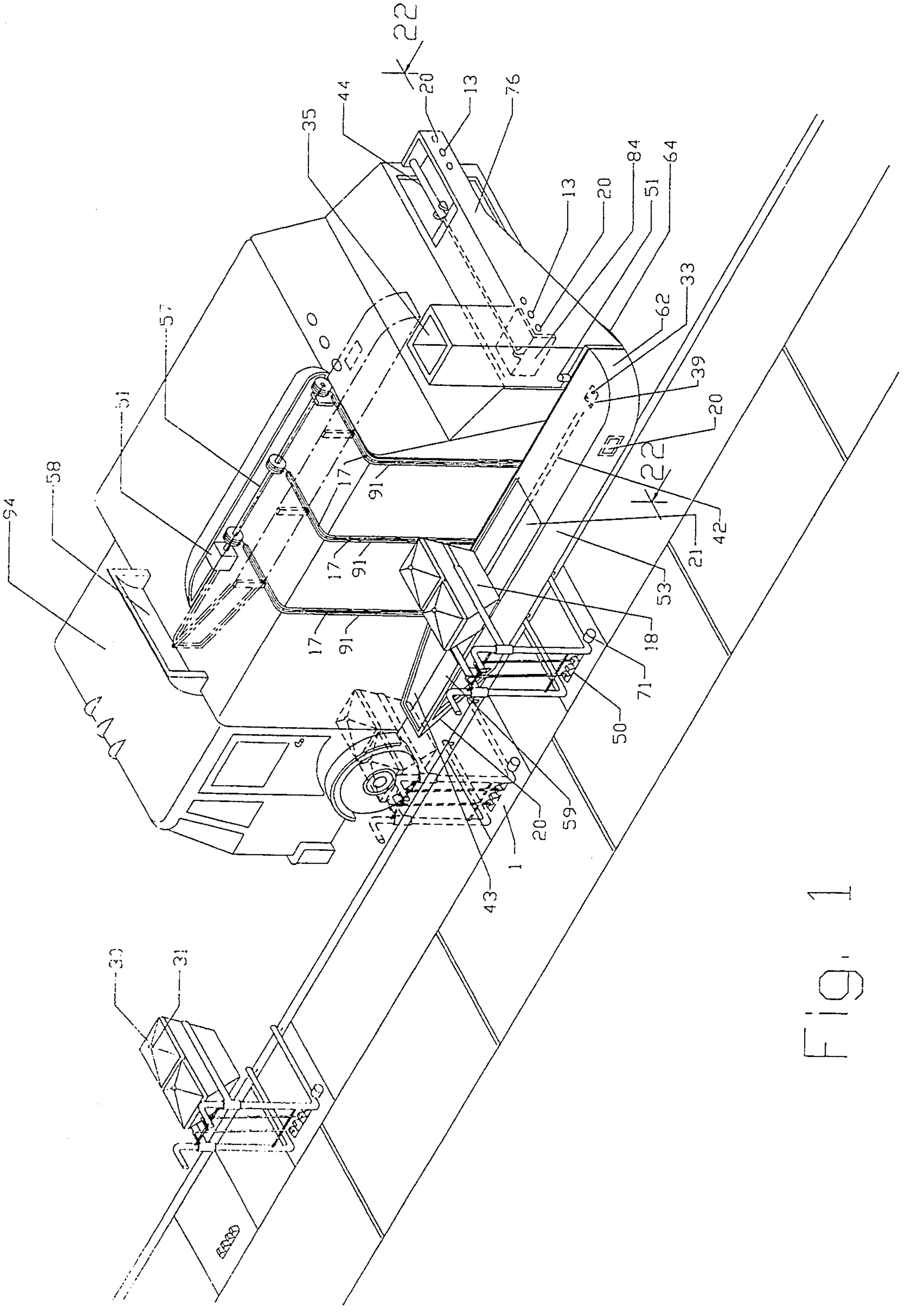
FIG. 1 is a prospective view of the garbage truck, the projecting guide collection device (hereafter called CD), secondary conveyor, dust collector, lifting mechanism and garbage can about to deposit garbage in accord with invention.

Turning now to the attached drawings in greater detail and referring first to FIG. 1.

FIG. 1 is prospective view of a garbage truck (94) in accord with the present invention. The truck (94) is approaching a cantilevered can (18) to collect its garbage. The projecting guide (59) has passed beneath the can (18). The collection device (53) is almost beneath the can (18). The top slide plate (88) of the collection device (53) has opened exposing the inside of the collection device (53) and the CD divider (21). Mounted on the side and bent over the top of the truck (94) are three tracks (91) through which cables (17) run (also see FIGS. 7, 8, 10, and 11). On the top of the truck (94) is a windlass (57), three sets of free rolling guide pulleys (60) and cables (17) that are attached to the windlass (57). In this figure, the projecting guide (59), the collection device (53) and quadrant #1 (62) (which is under the collection device (53) and can be seen in FIGS. 24 and 28) and quadrant #2 (63) of the pan (52) are suspended on the side of the truck (94) while the truck is in motion. A motor (51) is mounted on the top of truck (94). When they are not in use, the motor (51) is turned on and turns the windlass (57) and pulls the projecting guide (59), the collection device (53) and quadrants #1 (62) and #2 (63) of the pan, to the top of the truck (94). As these parts are raised and turned on their sides, dust and small debris that may have been left in quadrant #2 (63), fall into the dust collector (35) and into the secondary conveyor (76). The projecting guide (59), the collection device (53) and quadrants #1 (62) and #2 (63) are stored behind windbreakers (58) on the top of the truck (94). At the back of the truck (94) one can see the secondary conveyor (76), the dust collector (35), quadrant #3 (64) under the secondary conveyer and the universal hopper enclosure (82). On the outside side surface of the the projecting guide (59) and the collection device (53) are caution reflectors (20). On the outside back surface of the secondary conveyor (76) are caution reflectors (20) and brake lights (13) that are attached to the brakes of the truck (94).

The projecting guide (59), the collection device (53) and quadrants #1 (62) and #2 (63) of the pan (52) are mounted on a truck (94) as part of a single unit.

Figure 2:
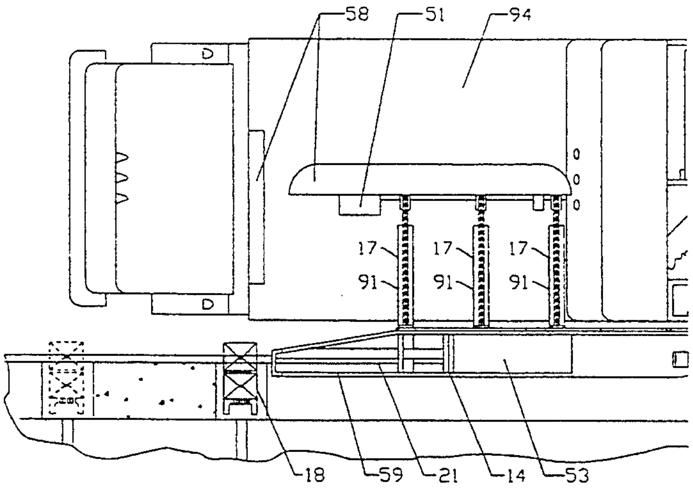
FIG. 2 is a top view of the garbage truck, the projecting guide and collection device, approaching a garbage can awaiting collection.

FIG. 2 is a top view of the garbage truck (94). The windbreakers (58) and cables (17) can be seen. The collection device (53) is suspended on the side of the truck (94). The truck (94) is approaching a garbage can (18) awaiting collection. A guide (59) projects forward from the collection device (53). The top slide plate (88) of the collection device (53) is closed. Its bumper (14) can be seen.

Figure 3:
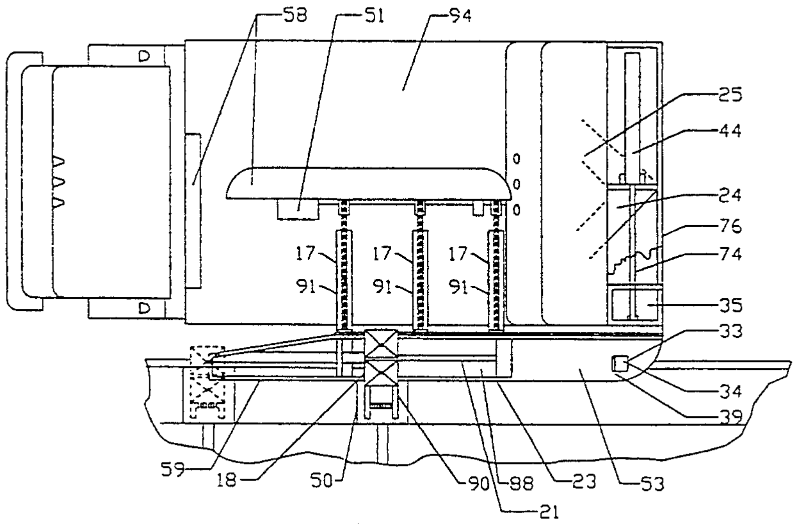
FIG. 3 is a top view of the garbage truck, projecting guide and collection device. The can and the collection device have both opened. The garbage is being collected from the can.
Figure 14:
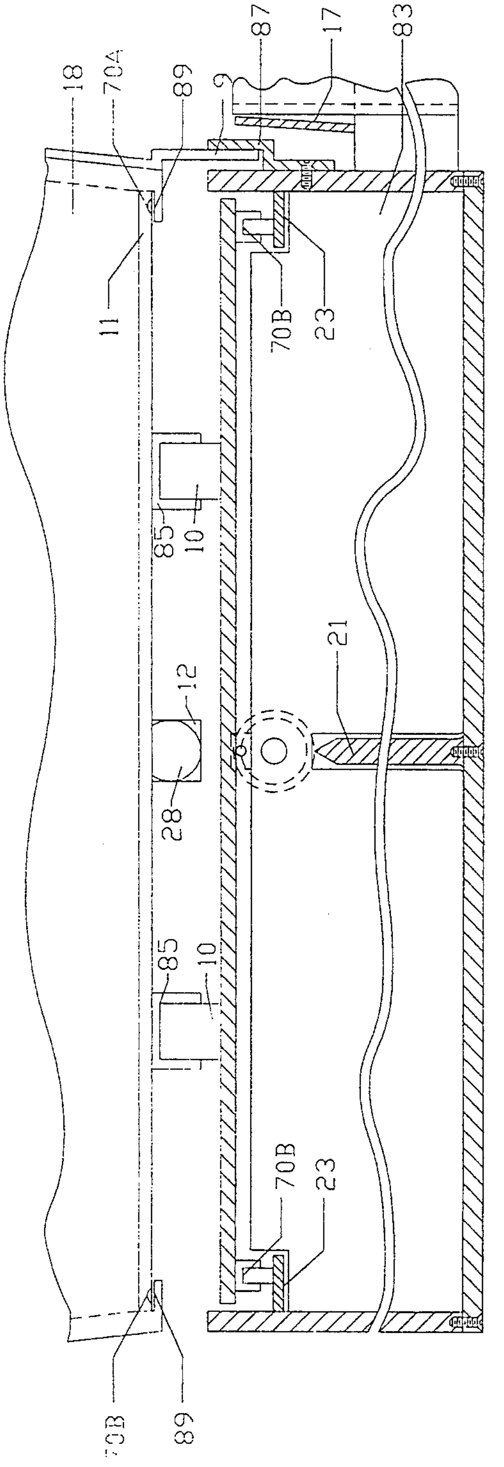
FIG. 14 is a front view of the bottom edge of the can. The pneumatic cylinder is seen. The targets are engaging the bottom plate openers.
Figure 15:
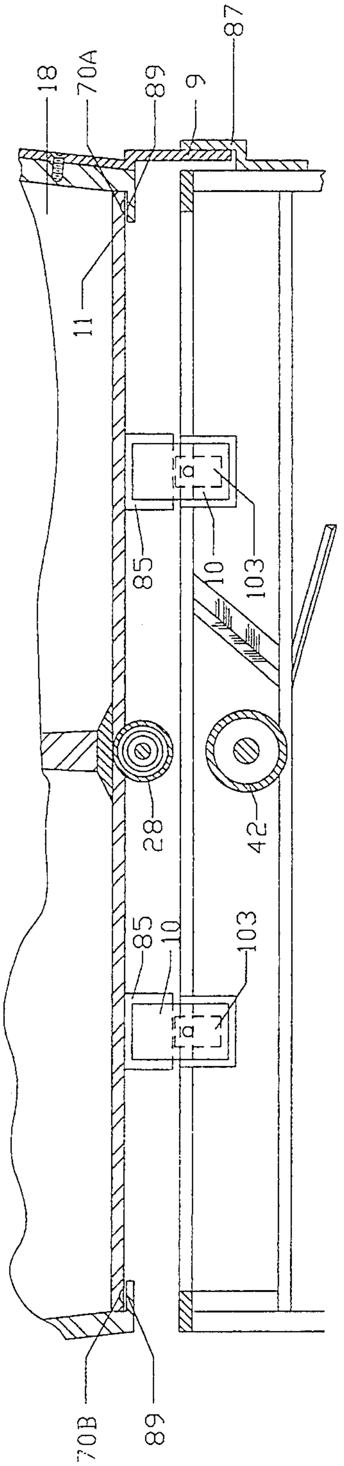
FIG. 15 is a cross section of the central view of the bottom of the can and the slide plate openers on the top of the collection device. The pneumatic cylinder is seen.

In FIG. 3 the truck (94) has moved forward. The projecting guide (59) has aligned the can (18) and the collection device (53) by pushing the can (18) laterally on track #2 (90) (which can be seen in FIGS. 5 and 6) over the collection device (53). The lateral movement is under tension from the force of a spring (80) (which can be seen in FIG. 5) attached to the can's (18) mobile supporter (50). The bottom guide (9) for the can (18) and top guide (87) on the collection device (53) are in contact with one another (as can be seen in FIGS. 14 and 15). Tracks set #2 (90) has extended and now hold the can (18) over the collection device (53). By a power means, the top slide plate (88) has rolled in channels (23) opening the collection device (53). Garbage is falling into the collection device (53) which is divided in half lengthtwise by the CD divider (21). If the refuse has been previously sorted, the CD divider (21) keeps the garbage on different sides of the CD divider (21) as it falls into the designated side of the collection device (53). If the garbage is unsorted, the homogeneous garbage will fall on both sides of the CD divider (21).

Figure 4:
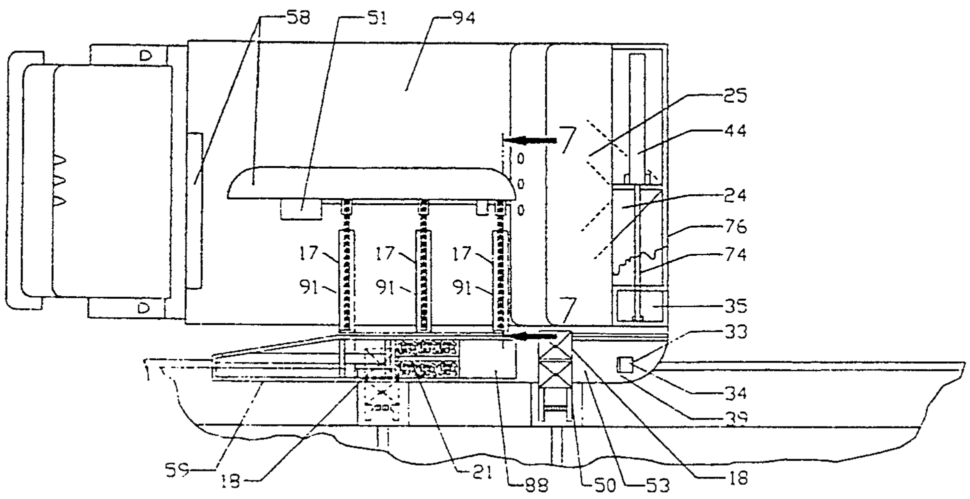
FIG. 4 is a top view of the garbage truck, projecting guide and collection device. The garbage has been collected. The can has closed. The top slide plate of the collection device is in the process of closing.

In FIG. 4 the garbage truck (94), which is still moving forward, has collected the garbage. The top slide plate (88) the collection device is in the process of closing. The guides for the can (18) and collection device (53) are no longer in contact with each other. The can (18) is being pulled back to its original position by a spring (80) attached to the mobile supporter (50) (see FIG. 5).

Figure 5:
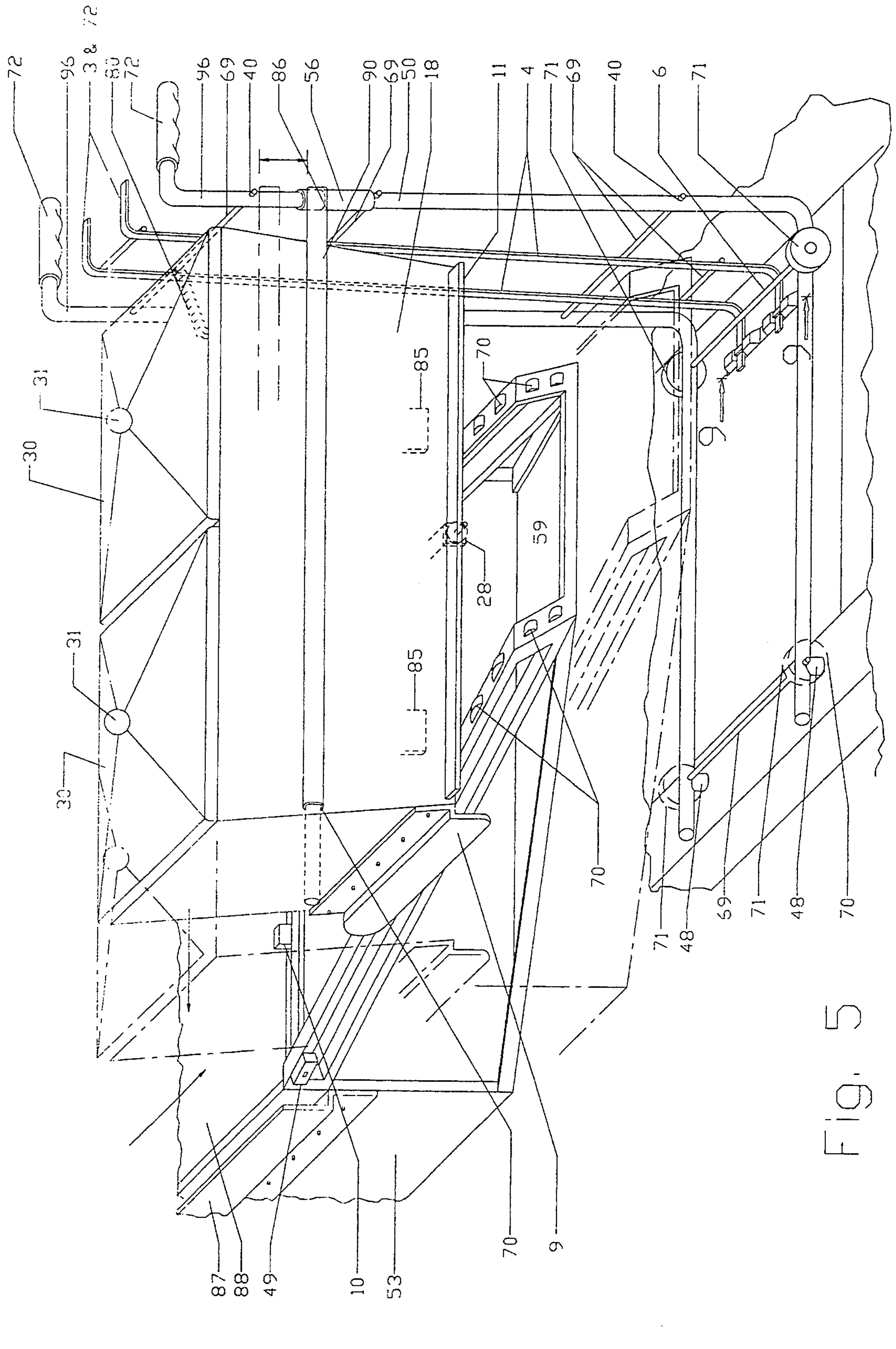
FIG. 5 is a prospective view of the garbage can, anchored in place with the projecting guide of the collecting device moving underneath the can.

FIG. 5 is a prospective view of the garbage can (18) being held in a cantilevered position by its mobile supporter (50) on a set of tracks (90). The anchor keys (4) are under anchors (1) holding the mobile supporter (50) in place. The forward part of projecting guide (59) of the collecting device (53) is moving underneath the can (18). Along the forward and top edges of the projecting guide (59) are rollers (70). One of the novel features of the can (18) is that it can be moved vertically and laterally. If the collecting device (53) is high, then its projecting guide (59) will come in contact with the bottom of the can (18). The rollers (70) on the top of the sides of the projecting guide (59) will reduce the friction between the projecting guide (59) and the can (18). The can (18) is supported on a track (90), one part of which is attached to the can (18) and the other is attached to the mobile supporter (50). The tracks (90) are attached to collars (56) around the verticle member of the "Z" shaped member (96) of the mobile supporter (50). The collars (56) being wider that the "Z" shaped tubes (96), permit the can (18) to be moved vertically.

The projecting guide (59) may lift the can (18) while on its mobile supporter (50). The can's (18) downward motion is limited by a rod (69) that extends through the "Z" shaped tubes (96). Each of the rods (69) on the mobile supporter (50) have threaded ends that have a smaller diameter than the balance of the rods (69). The threaded portion of the rods (69) extend through holes (40) in the "Z" shaped tubes of the same diameter and protrude so that nuts can be affixed outside of the shaped tubes to hold the rods (69) and "Z" shaped tubes (96) in place. The wider portion of the rods (69) keeps the "Z" shaped tubes (96) a fixed distance apart from one another. A bottom guide (9) which is mounted toward the bottom of the can (18) and a top guide (87), mounted toward the top of the collection device (53), are about to come in contact with one another. The two guides, (9) and (59), will horizontally align the can (18) with the collection device (53) and it's targets (85), which are part of the bottom slide plate (11).

If, as the collection device (55) is moved forward, it is perfectly aligned with the can (18), the can's bottom guide (9) will not touch the collection device's projecting guide (59) but if they are not perfectly aligned, then the guides, (9) and (59), will make contact. Then, as the collection device (53) continues to be moved forward, the projecting guide (59) will slide the can (18) laterally on track #2 (90) and align the can (18) with the collection device (53). When the can (18) is aligned with the collection device (53) and the bottom slide plate (11) touches the limit switch (49), an electrical signal is sent to hydraulic cylinder #1 (42) causing it to contract and move the top slide plate (88) to its opened position. The collection device (53) is then ready to collect garbage. The can's bottom guide (9) will slide along the collection device's top guide (87) keeping the can (18) and collection device (53) in alignment until the collection device (53) completes its passage beneath the can (18). The collection device (53) continues to be moved forward. Targets (85) extend upward from the bottom of the can (18). The bottom plate openers (10) on the top of the collection device (53) come in contact with targets (85) and by their forward motion, they push against the targets (85). The bottom slide plate (11) of the can (18) is moved backward on track #2 (90) opening the can (18). At the same time the force of the bottom plate openers (10) compress a spring in a pneumatic cylinder (28) mounted on the bottom of the can (18). The garbage falls from the bottom of the now opened can (18). After the garbage has been discharged, the targets (85) and the bottom plate openers (10) disengage and the bottom slide plate (11) and the compressed spring in the pneumatic cylinder (28) are released. The spring in the pneumatic cylinder (28) extends and slides the bottom slide plate (11) closed.

Of the known garbage cans, none are held in a cantilevered position, none open from the bottom or discharge their contents from the bottom, none are self-closing, none slide into position for alignment and none return to their original position after they have been emptied. Where refuse is required to be divided for recycling purposes, the can, which is the subject of this invention, may be divided into two sections. The two sections make it possible to hold different types of refuse in separate compartments.

The garbage can (18) is unique in many respects. It is designed so that at no time does the can (18) rest on the ground. The can (18) is cantilevered over the ground from its mobile supporter (50). The can (18) is held in the cantilevered position while being filled, while it stores refuse and while being emptied. It is also unique in that it is emptied without the necessity of being lifted. While all existing cans are emptied by turning them over the can (18), that is the subject of this invention, is emptied from its bottom. The fact that the can (18) does not have to be lifted to be emptied or the refuse manually handled, eliminates the possiblities of the numerous common injuries that too frequently result from lifting ordinary garbage cans. These injuries result from handling the garbage and from coming in contact with sharp objects that often protrude through garbage bags. By the elimination of direct contact with garbage, there is a corresponding elimination of the possibility of contact with germs. In addition, in the proposed system there will be no noise that results from banging gargage cans against the truck's hopper to empty the can, nor will there be noise that frequently results from a can and/or the cover being dropped on the ground.

Also in FIG. 5 is the mobile supporter (50) that holds the can (18) in a cantilevered position. The mobile supporter makes it possible for the can (18) to be wheeled. The mobile supporter (50) is made of two parallel "Z" shaped tubes (96), that are kept apart by horizontal rods (69). The top of the tubes (96) have rubberized grips (72) that serve as handles. The rods (69) pass through holes (40) in the tubes (96). The mobile supporter (50) has a pair of wheels (71) in the back that use a rod (69) as an axle (6) and it has a pair of legs (48) with stoppers (73) attached to the tubes (96) or a second set of wheels (71). At the bottom of the tubes (96) are stoppers (73) which are used to keep the tubes (96) clean.

The mobile supporter (50) has a set of cantilevered tracks #2 (90) and rollers (70). One part of track #2 (90) is attached to the mobile supporter (50) and the other is fixed to the body of the can (18) by means of two threaded rods (88). There is a hole (40) at the end to attach to the mobile supporter (50). Track #2 (90) is parallel to the ground projecting away from the verticle member of the "Z" shaped tubes (98). Track #2 (90) allows the can to be moved laterally, expanding a spring (80) attached on one end to the mobile supporter (18) and on the other end to the can (18). This enables the can (18) to be aligned with the collection device (53). As the collection device (53) completes its passage beneath the can (18), the top guide (87) is moved passed the bottom guide of the can and the top guide (87) bottom guide end contact with one another. The eliminates the lateral resistance to the extended spring (80). The spring (80) contracts and causes the now empty can (18) to slide back to its original position. The can's (18) lateral motion is stopped by a rubber bumper (14). Track #2 (90), has stoppers (75) at its ends fartherest from the verticle member of the "Z" shaped tubes (96). These limit the lateral movement of the can (18).

A third part of the mobile supporter (50) are a set of two wheels (71) and legs (48), or in the alternative four wheels (71). The wheels (71) are mounted outside of the bottom of the "Z" shaped tubes (96). They use a horizontal rod (69) on the mobile supporter (50) as an axle (6). By exerting downward pressure on the rubber grips (72), mobile supporter (50) can be wheeled and the can (18) may be rolled to curbside, or to another location, instead of having to be carried. The legs (48) are also mounted on the mobile supporter (50). The legs (48) support the can (18). The legs (48) are made of tubing closed at their lower ends by rubber stoppers (73).

There are devices used to roll ordinary garbage cans but none roll cans in a cantilevered position and none allow a can to be emptied without being removed from its carrier.

A fourth portion of FIG. 5 are the anchor keys (4). The anchor keys (4) are made in the form of hollow rectangles. The anchor keys (4) are bent like squared letter "Z"s. The anchor keys (4) are mounted on a single axle (6) attached to the mobile supporter (50). Rods (69), are used to hold the anchor keys (4), apart. Each of the rods (69) between the anchor keys (4) have threaded ends that have a smaller diameter than the balance of the rods (69). The threaded portion of the rods (69) extend through holes (40) in the "Z" shaped members of the anchor keys (4) of the same diameter and protrude so that nuts can be affixed outside of the shaped tubes to hold the rods (69>and "Z" shaped members in place. The wider portion of the rods (6) keeps the "Z" shaped members a fixed distance apart from one another. There are rubber stoppers at both ends of the anchor keys (4). The top of the anchor keys have rubber grips (72) which act as handles (3). The bottom parts of the anchor keys (4) are longer than the top. As the anchor keys (4) are pushed into place they slide under anchor bridges (2) (see FIG. 9) and as they do so they dislodge debris that might have accumulated under the anchor's bridges (2). A spring is attached to the rod (69) and to the the anchor keys (4). When the anchor keys (4) are slipped out from under the anchor bridge (2), the spring (80) contracts and tips the anchor keys (4) upwrite so that they are off the ground.

To operate the anchor keys (4), the anchor key handles (3) are pulled backward forcing the bottom of the anchor keys (4) to move forward. That motion slides the bottom of the anchor keys (4) under the anchors' bridges (2). The anchor key handle (3) is then released. By pushing the anchor key handles (3) forward and rolling the mobile supporter (50) away, the mobile supporter (50) is released from the anchors (1).

Figure 6:
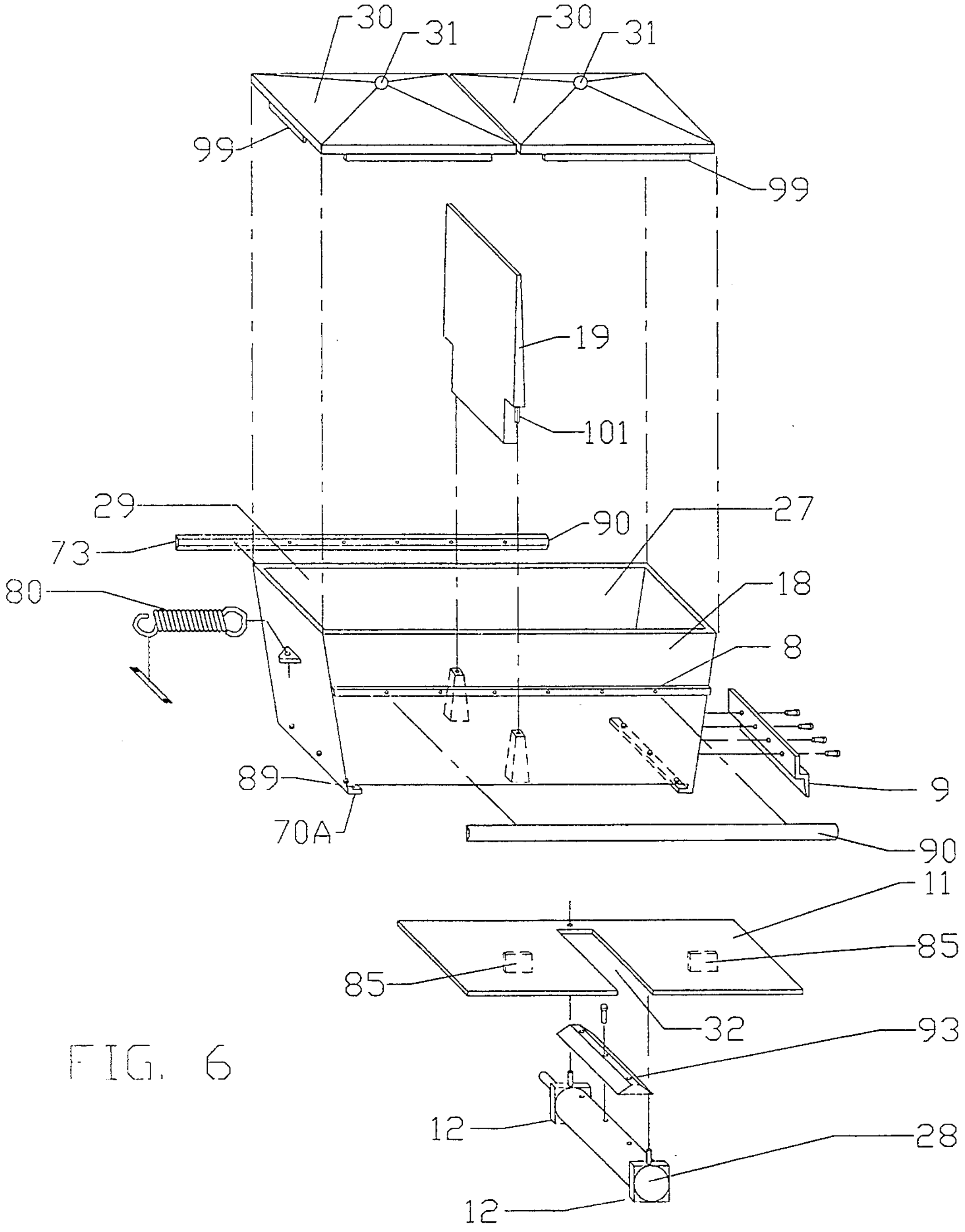
FIG. 6 is an exploded view of the garbage can.

FIG. 6 is an exploded view of the garbage can (18). The garbage can (18) is filled from the top through twin covers (30) each having sleeves (99) underneath that are angled to fit the can (18). Each cover (30) has a handle (31). When the covers (30) are removed, garbage may be deposited. The front of the can (18), the back, and the sides are in the shape of isosceles trapazoids. The can (18) has two compartments (27) created by the can's divider (19). The can's divider (19) has pins (101) that are used to affix the can divider (19) into place inside of the can (18). It is also fastened by screws (not shown), that come up through the bottom of the can (18). The can divider (19) will be put into place if the garbage being collected is being sorted for recycling purposes. The compartments (27) make it possible to simultaneously store and simultaneously discharge different types of refuse. The can (18) is supported in a cantilevered fashion from a mobile supporter (50) on track #2 (90) which can been seen in FIG. 5. Track #2 (90), is attached to the mobile supporter (50) and to the body of the can (18) by nuts and bolts (8), and by threaded rods (86). Each component of track #2 (90) has rollers. Track #2 (90) is parallel to the ground. The body of the can (18) is attached to a spring (80) that is attached to the mobile supporter (50).

The can's (18) bottom is a slide plate (11) that rests on track #1 (89) attached to the sides of the can (18). Track #1 has rollers (70A). Track #1 (89) and its rollers (70A), facilitate opening and closing the bottom slide plate (11). The bottom slide plate (11) has a cut-out (32) to provide space for a pneumatic cylinder (28). The cut-out (32) faces the expected garbage truck (94). The pneumatic cylinder (28) is held in place by both brackets (12) which are bolted to the bottom of the can (18) and by a threaded pipe screwed through a threaded hole of the same thickness. Holes drilled into the can (18) accommodate bolts. A trapazoidinal plate (93) is bolted across the bottom of the can (18) from front to back. The bolts go through the brackets (12), the holes (40) and the trapazoidinal plate (93). Nuts and washers hold the cylinder in place. On the lower side of the can (18) is the bottom guide (9) that is used to hold the can (18) and the collection device (53) in alignment.

The bottom slide plate (11) of the can (18) has two targets (85). The targets (85) extend 90 degrees downward from the bottom slide plate (11). As the collection device (53) is moved forward and is aligned with the can (18), the slide plate openers (10) that project upward from the collection device (53) encounter the targets (85). The bottom plate openers (10) exert a lateral force on the targets (85) and slide the bottom slide plate (11) from beneath the can (18). Refuse in the can (18) falls.

Figure 7:
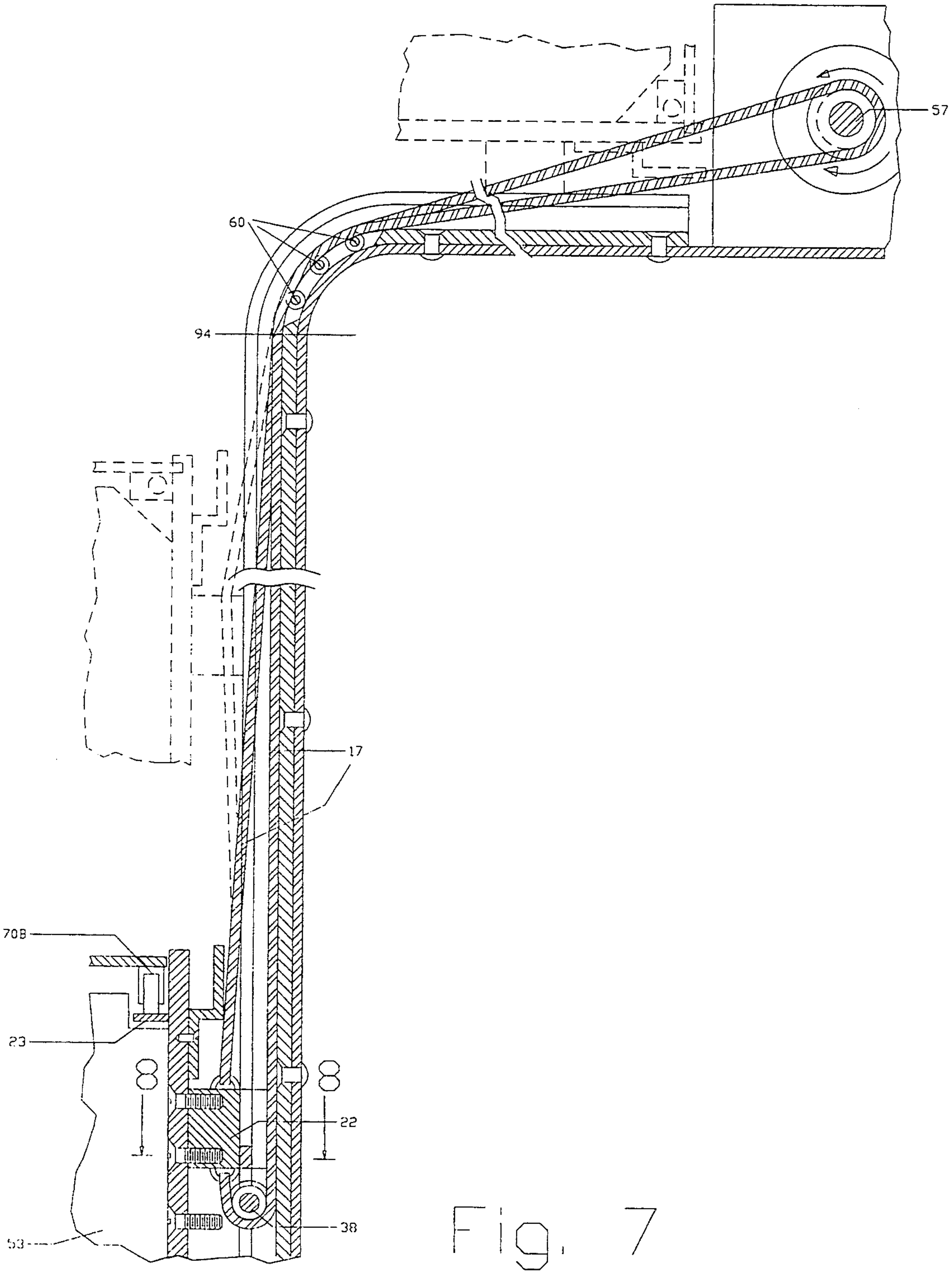
FIG. 7 is a cross section through the track of the cable hoisting system. Cable is attached to both the windlass and to the CD supports.

FIG. 7 is a cross section through track (91) showing the cable hoisting system (16). The cables (17) are attached to the windlass (57) and the top of the CD supports (22) (see FIG. 1). Each cable (17) goes up to the top edge of the truck (94) within a track (91), around three free rolling guide pulleys (60), then across the top of the truck (94), around the windlass (57), back across the top of the truck (94), around the free rolling guide pulleys (60), inside the track (91), down the side of the truck (94) to the bottom of the track (91), around a single sided pulley (38) and then up to the bottom side of the CD support (22) where they are attached. A motor (51), mounted on the top of the truck (94), is connected to the windlass (57) and provides power to pull the projecting guide (59), the collection device (53) and one half of the pan (52) to the top of the truck (94) when they are not in use and it may lower them when they are needed to collect garbage.

Figure 12:
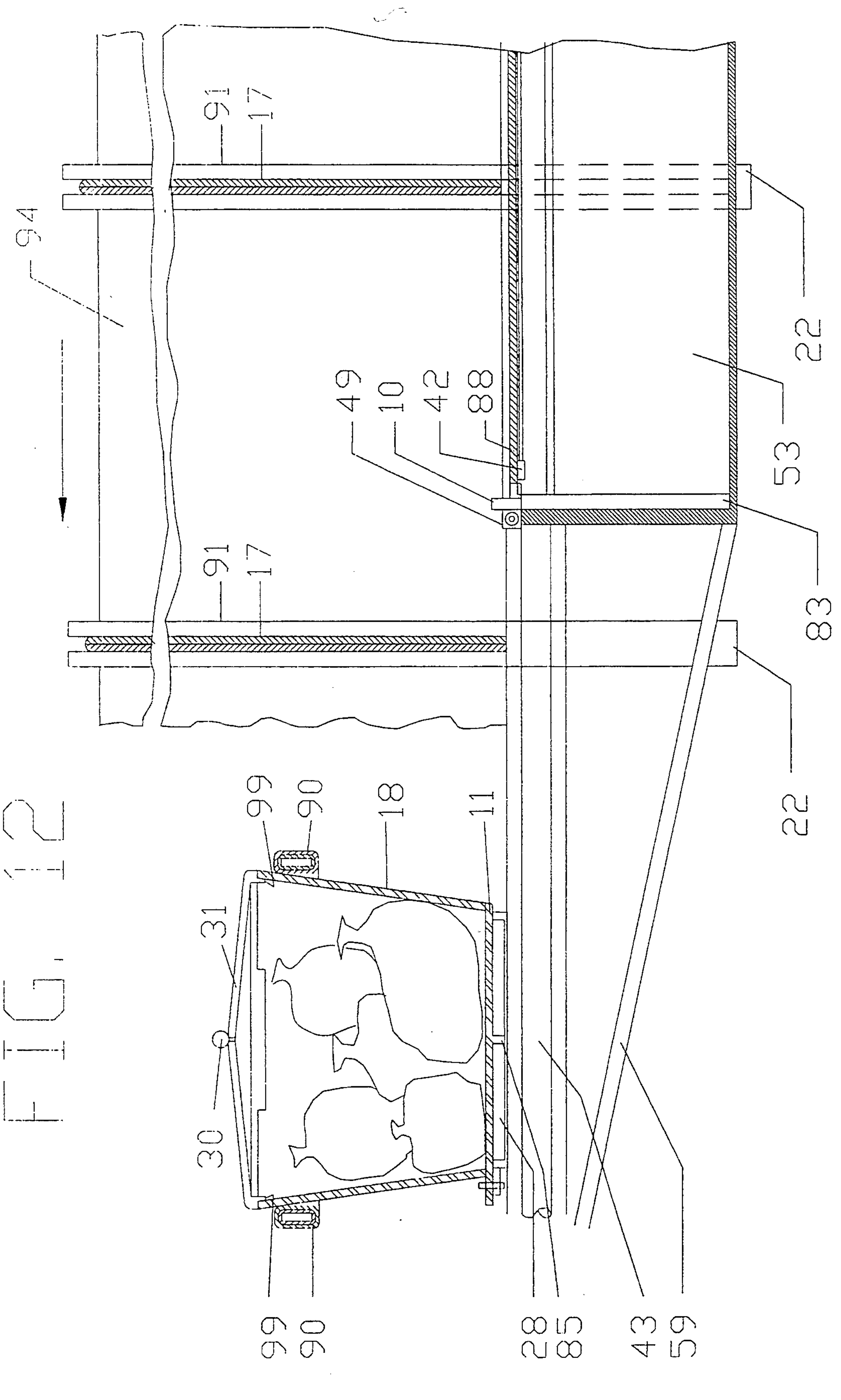
FIG. 12 is a side view of the filled garbage can above the projecting guide of the collection device, the collection device, limit switch, hydraulic cylinders #1 and #2 and the attached CD sweeper.

The projecting guide (59) and collection device (53) are carried on the side of a garbage truck (94) while refuse is being collected (see FIG. 12). They are supported by the CD supports (22) (see FIG. 1). At the end of each CD support (22) is a "H" shaped mounting block that fits into tracks (91) that are attached to the sides and top of the truck (94). The collection device (53) may be welded to the CD supports (22) or attached by nuts and bolts. The front of the projecting guide (59) faces the same direction as the path of the truck (94).

Figure 8:
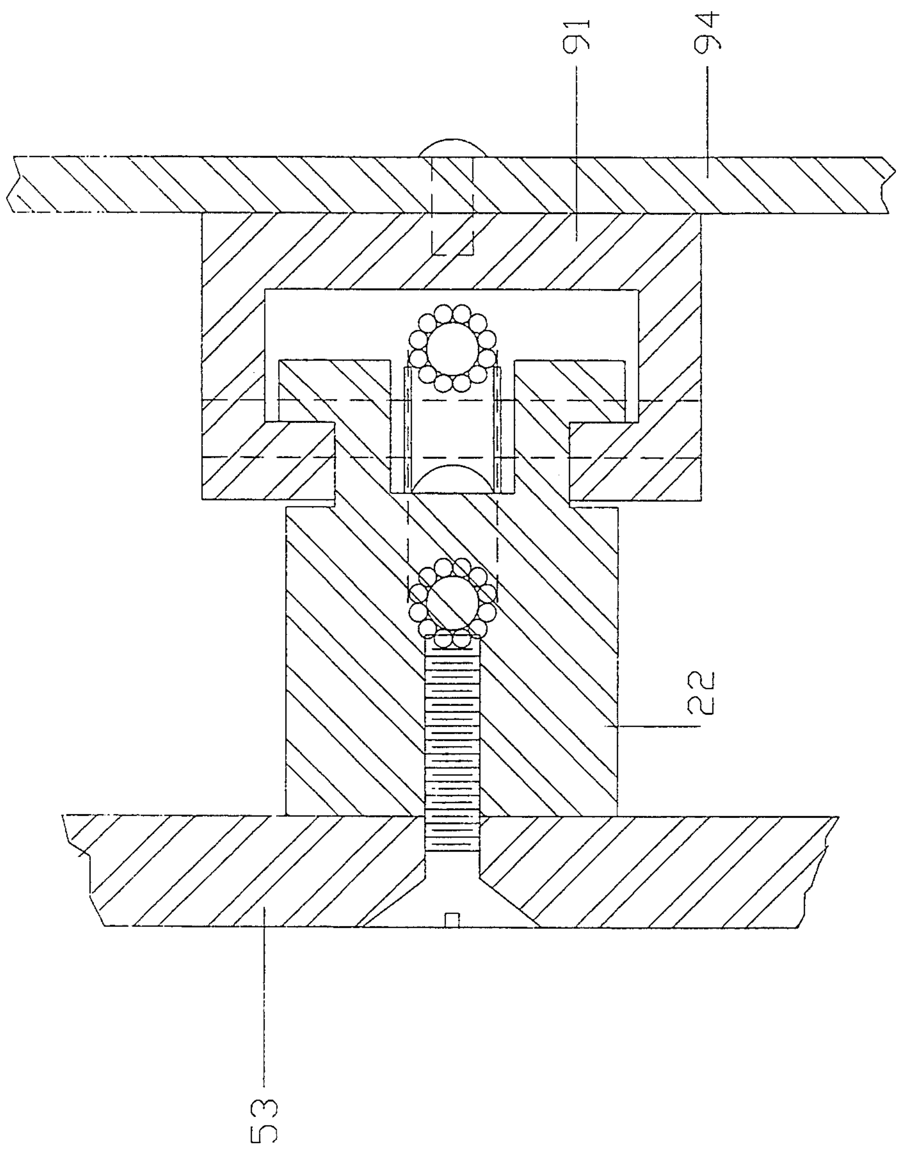
FIG. 8 is a cross section of the mounting block attached to the CD supports and the track on the truck.

FIG. 8 is a top cross section of track (91) and the "H" shaped mounting block which is part part of the CD support (22). The side of the truck (94) and the edge of the collection device (53) can be seen. The tracks (91) ere used to guide the mounting block and its CD supports (22) as the projecting guide (59), collection device (53) and half the pan (52) are raised and lowered. At the lower end of each track (91) are cut-outs (32). Rectangular bars may be inserted into the cut-outs after the CD supports (22) are inserted into the tracks (91) from the bottom. A cotter pin is inserted into holes in each end of the rectangular bar (66) to insure that the bars (66) stay in place.

After the collection device (53) completes its passage beneath the can (18), (see FIG. 19) the targets (85) disengage from the bottom plate openers (10). The spring in the pneumatic cylinder (28) is released and it pushes the bottom slide plate (11) to its closed position. Hydraulic cylinder #1 (42) then extends, moving the top slide plate (88) to its closed position.

Figure 9:
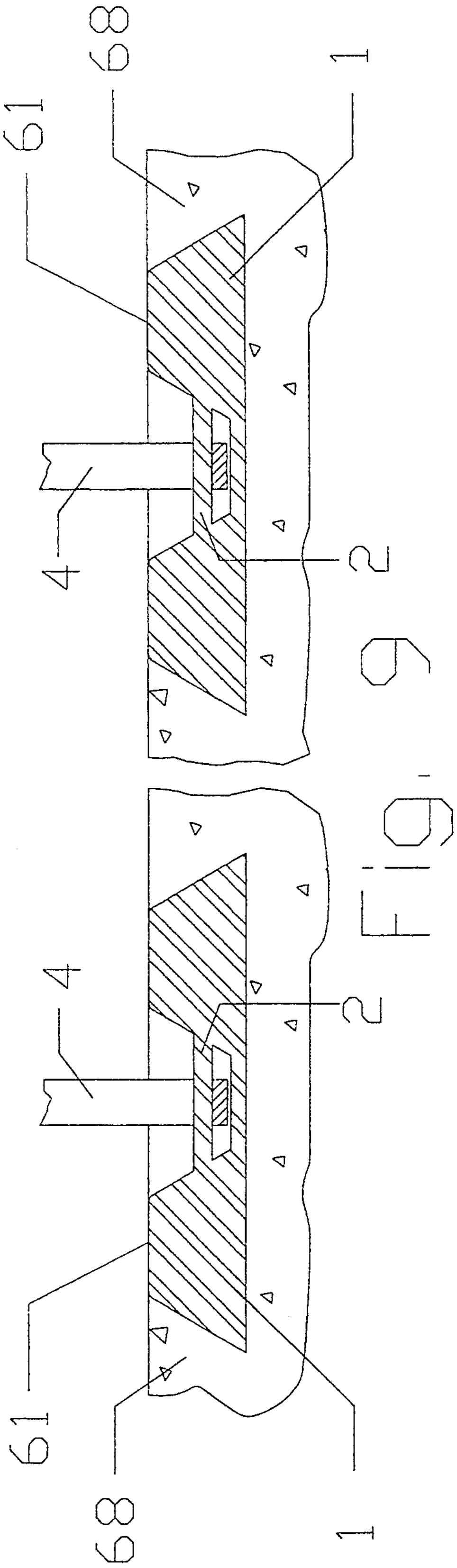
FIG. 9 is a side view of anchor keys having been slipped under the anchor bridges and the anchors inbedded into a road surface.

FIG. 9 is a front view of the anchor keys (4) having been slipped under anchors (1) embedded in a road surface (68). The anchor keys (4) are also seen in FIG. 5. The anchor (1) has a rectangular base. Extending upward from the base of the anchor (1) are two four sided pyramids (61). The top of each pyramid has been cut off so that each has a square flat top. The tops of the pyramids (61) are at the road surface (68). The tops of the pyramids (61) absorb any downward pressure that might be exerted on the anchor. If the anchors (1) are set too high in the road surface, the slope of the pyramids' (61) walls should cause sweeping and shoveling devices to pass over. The pyramids (61) are connected to one another by a bridge (2) which is below the surface of the road (68) to prevent it from being crushed. The anchor (1) is implanted into the surface of the ground (68) near the curb or side of a roadway although anchors (1) can be located at any other place that a can (18) and its mobile supporter (50) are to be secured.

Figure 10:
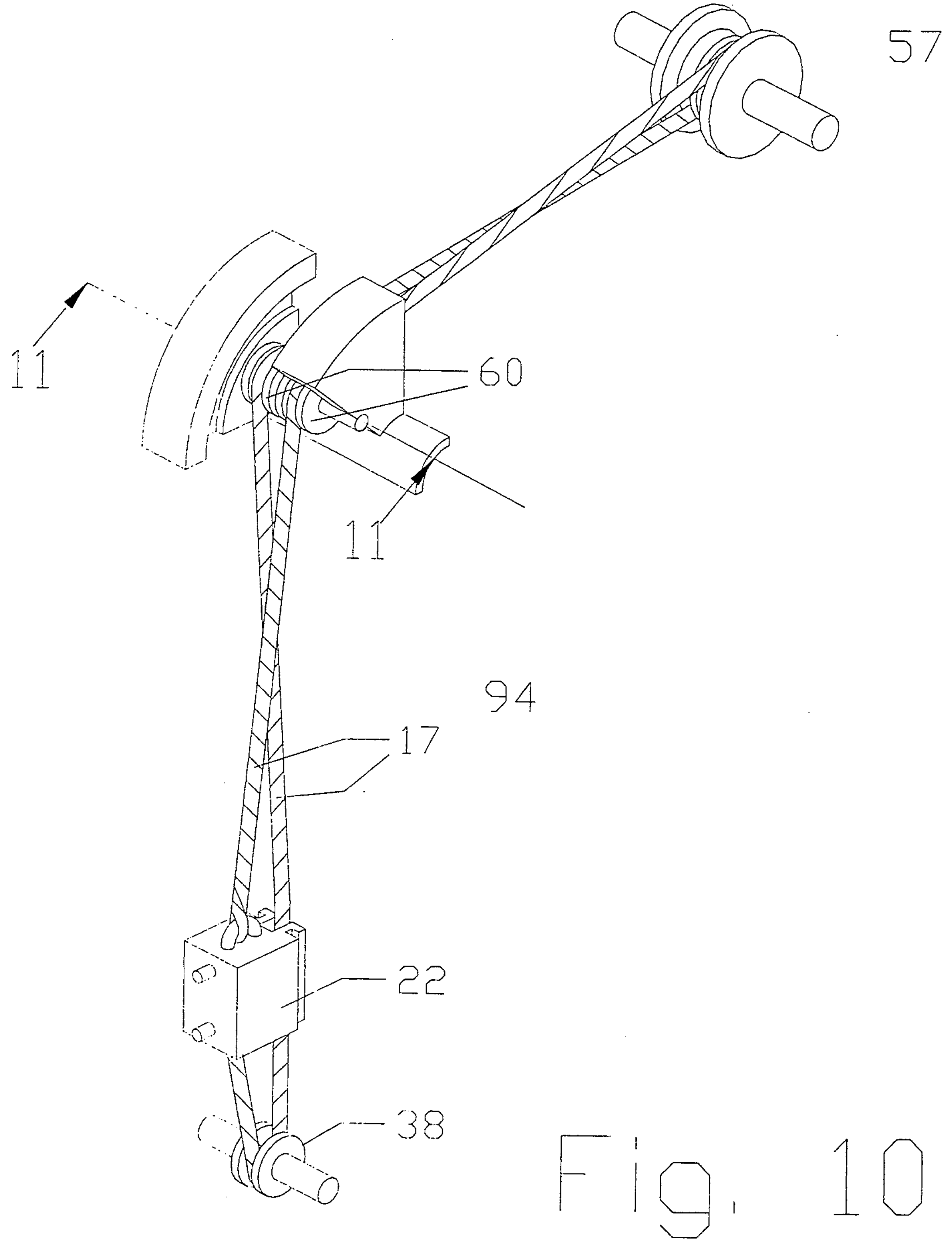
FIG. 10 is a prospective view of the cables coming over the free rolling guide pulleys. Cables are attached to both the windlass and the CD support.

FIG. 10 is a prospective view of the cables (17), without the tracks (91). Track (91) is attached to the truck (94) which is not shown. The cables (17) are attached to the top of the mounting block on the CD support (22). The cables (17) go up along the side of the truck (94) over pulleys (60) at the top edge of the truck (4), around the windlass (57), back over pulleys (60) at the top edge of the truck (94), down along the side of the truck (94), around a pulley (58) and the cables (17) finish at the bottom of track (91) which is attached to mounting block on the CD support (22).

Figure 11:
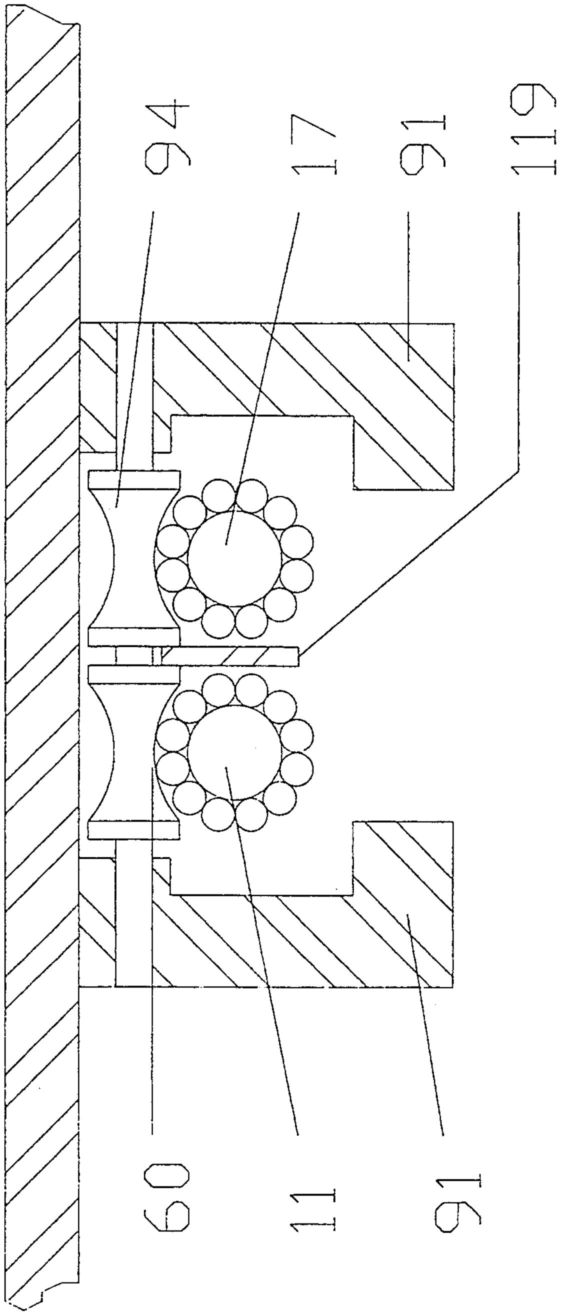
FIG. 11 is a top view of cables in a track.

FIG. 11 is a top view of cables (17) in track (91) as they come over free rolling guide pulleys (60) at the top edge of the truck (94). The cables are kept apart from one another by a pulley divider (119).

FIG. 12. This figure is a side view of a filled garbage can (18), the projecting guide (59), the collection device (53), the cables (17) and track (91) attached to side of the truck (94). The can (18) is above the projecting guide (59) in front of the collection device (53). The figure also shows the bottom slide plate (11) of the can (18), the targets (85) beneath the can (18), the bottom plate openers (10), hydraulic cylinder #1 (42) that opens and closes the top slide plate (88), hydraulic cylinder #2 (43) that pushes and pulls the sweeper (83) and the limit switch (49). The projecting guide (59) is intended to come into contact with the can's bottom guide (9). When the limit switch (49) touches the can's (18) bottom guide (9) an electrical signal is sent to hydraulic cylinder #1 (42) mounted within the collection device (53). Hydraulic cylinder #1 (42) contracts and opens the slide plate (88) on the top of the collection device (53). After full contraction, the limit switch (49) turns off. A delay switch (not shown) keeps hydraulic cylinder #1 (42) contracted. After a pre-determined passage of time, hydraulic cylinder #1 (42) extends completing the cycle. The delay switch will be reset whenever the limit switch (49) is touched again. The diagram also shows the CD supports (22) which which are supporting the projecting guide (59) and the collection device (53).

The base of the projecting guide (59) is bolted to the front of the collection device (53).

The projecting guide (59) also aligns the bottom plate openers (10) with the can's targets (85).

The top guide (87) is attached toward the top of the side of the collection device (53) that is farthest from the truck (94). The top guide (87) is designed to slide along the can's (18) bottom guide (9). Together they keep the can (18) and the collection device (53) aligned with one another until the garbage has been deposited in collection device (53) by the the can (18) and the collection device has completed its passage beneath the can (18).

Hydraulic cylinder #2 (43) is mounted within the projecting guide (59) extending forward from the collection device (53) One end is attached to the CD sweeper (83) which is inside the collection device (53). The CD sweeper (83) is moved by the force exerted on it by hydraulic cylinder #2 (43). The bottom plate openers (10) can be seen. When the limit switch (49) is activated, it causes hydraulic cylinder #2 (43) to extend and it pushes the CD sweeper (83) along channels (23) on the top of the side walls of the collection device. After full extension, the limit switch (49) is turned off. Hydraulic cylinder #2 (43) contracts, pulling the sweeper back to its original position and the cycle is completed. The motion of the CD sweeper (83) has pushed the garbage from the place where the garbage was deposited in the collection device (53), to quadrant #2 (63) of the pan (52) (see FIG. 24) at the rear of the collection device (53).

Figure 13:
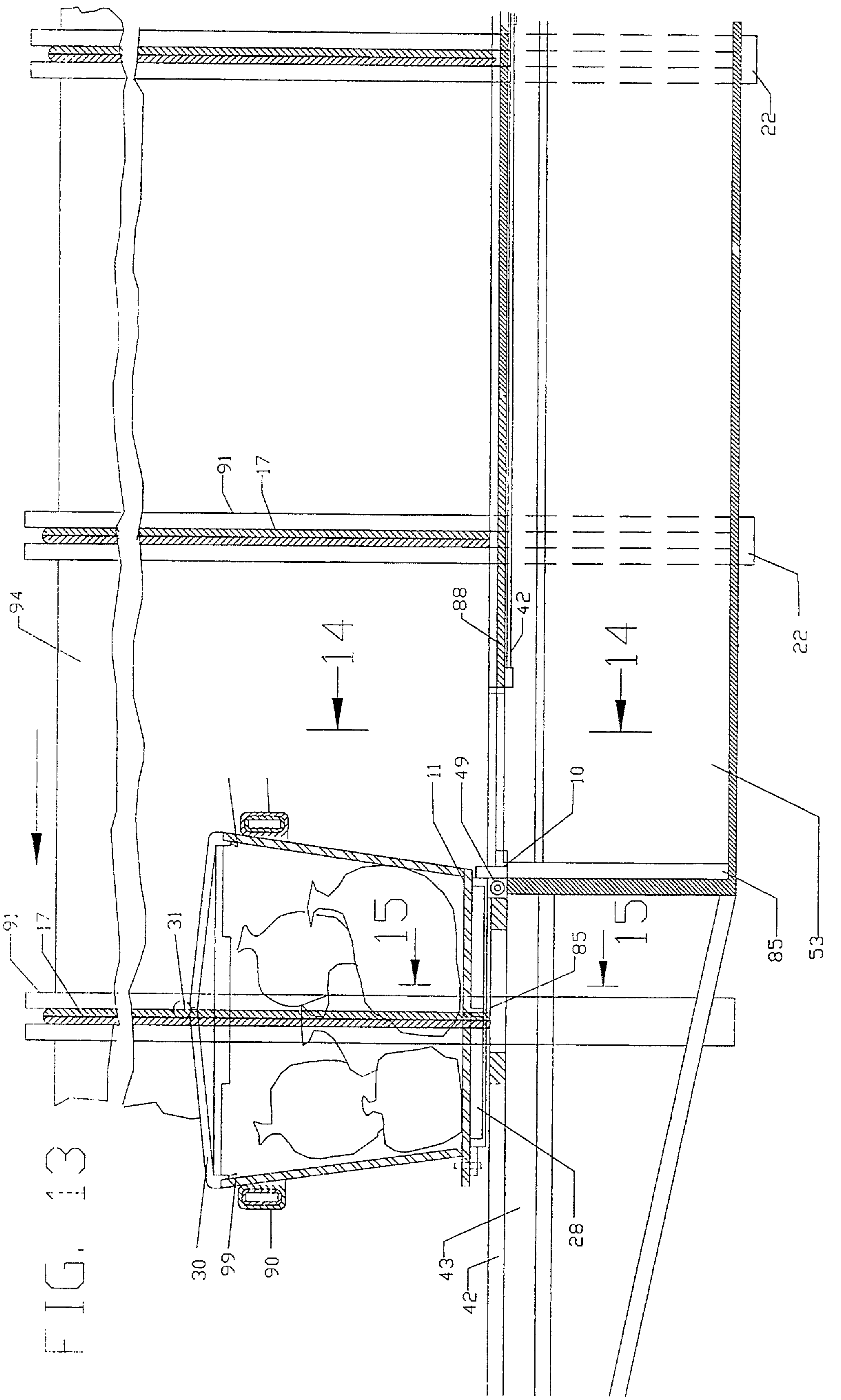
FIG. 13 is a side view of the can activating a limit switch, opening the top of the collection device. Targets are engaging the bottom plate openers.

FIG. 13. The limit switch (49) (shown in FIG. #5) has made contact with the projecting guide (59) and has caused hydraulic cylinder #1 (42) to begin to pull the top slide plate (88) backward making an opening into which the rubbish in the can will fall begin to open the collection device (53). The targets (85) and the pneumatic cylinder (28) can be seen under the can (18). The can is still over the projecting guide (59). The CD supports can be seen on the side of the truck (94). The top slide plate is supported on rollers that move in channels (23). When hydraulic cylinder #1 extends the top slide plate (88) is closed. The Figure also shows the can's (18) targets (85) and the bottom plate openers (10) which have not been engaged.

FIG. 14 is a front view of the edge of the can's bottom slide plate (11). The targets (85) are engaging the bottom plate openers (10). The top of the collection device (53), the top slide plate (88) with rollers (70) for support moving in channels (23) can be seen. The bottom plate openers (10) are located behind the projecting guide (59) and in front of the collection device (53). The two bottom plate openers (10) project upward and are intended to engage twin targets (85) that extend downward from beneath the refuse can (18). The bottom slide plate openers (10) are held in an upward position by torsion springs (103) that have greater force than the pneumatic cylinder (28) located under the can. Brackets (12) that hold the pneumatic cylinder (28) can be seen. The CD sweeper (83), and the CD divider (21) can also be seen. The hydraulic cylinder (42) within the collection device (53) has been drawn lightly.

As the garbage truck (94) continues to move forward, the bottom plate openers (10) encounter the targets (85). The can's bottom slide plate (11) is pushed opened. The targets (85) meet resistence from the bottom plate openers (10) when the top slide plate (88) is fully opened. At that point the torsion springs (103) give way. The bottom slide plate openers (10) lean over and disengage from the targets (85). The bottom plate openers (10) spring back to their original position and are ready for an encounter with another set of targets (85). FIG. 14 also shows the can (18), the can's bottom guide (9) and the top guide (87) for the collection device (53).

FIG. 15 is a section across the center of the can (18) towards it bottom. One can see the pneumatic cylinder (28) the targets (85), the bottom slide plate (11) and the bottom guide (9) under the can (18). One can also see the projecting guide (59), the top guide (87) and the torsion springs (105) and the bottom plate openers (10) on the top of the collection device (53).

The top slide plate (88) for the collection device (53) moves on rollers (70) in channels (23), that comprise track #4, which are attached to top slide plate (88) and the collection device (53) respectively. Attached to the front edge of the top slide plate (88) is a hard rubber strip that acts as a bumper (14) (see FIG. #2). Hydraulic cylinder #1 (42) and the projecting guide (59) can be seen.

Figure 16:
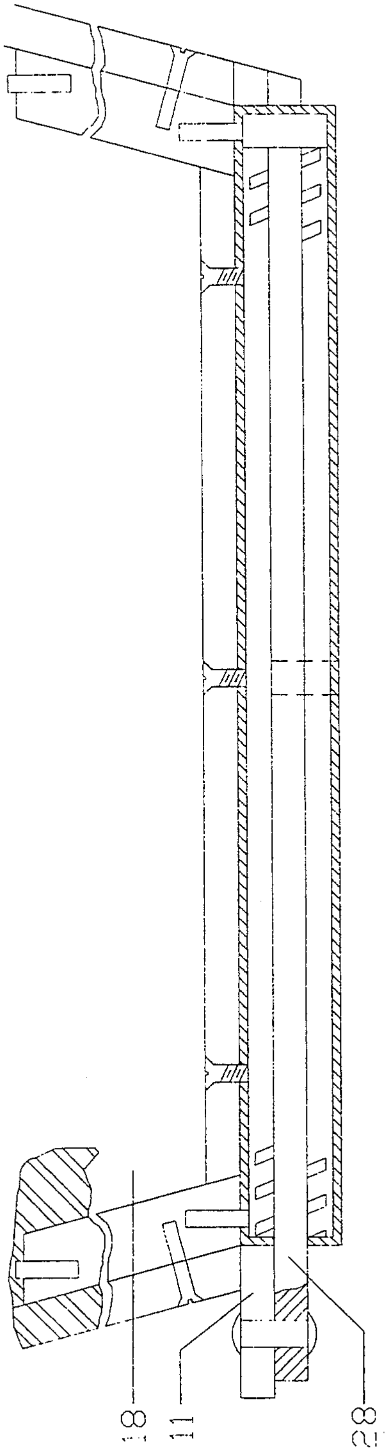
FIG. 16 is a side view of the front and back walls and can's bottom slide plate about to engage the pneumatic cylinder under the can.

FIG. 16 is a cross-section through the middle of the can (18), the pneumatic cylinder (28) and can's bottom slide plate (11) shown when the bottom plate openers (10) are about to exert pressure on the pneumatic cylinder (28) under the can (18). The front and back- walls and of the can (18) can be seen.

Figure 17:
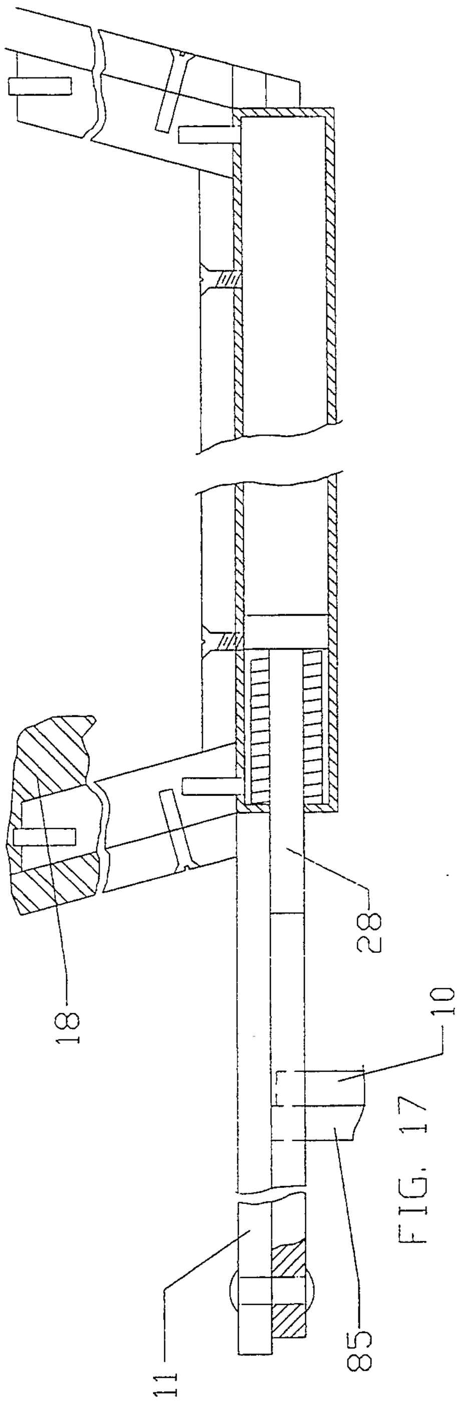
FIG. 17 is a side view along the bottom of the can and the pneumatic cylinder in its compressed position.

FIG. 17 is a side view of the can (18) showing the can's (18) front and back walls and the pneumatic cylinder (28) now compressed. The bottom slide plate (11) of the can (18) has been been moved from under the can (18).

Figure 18:
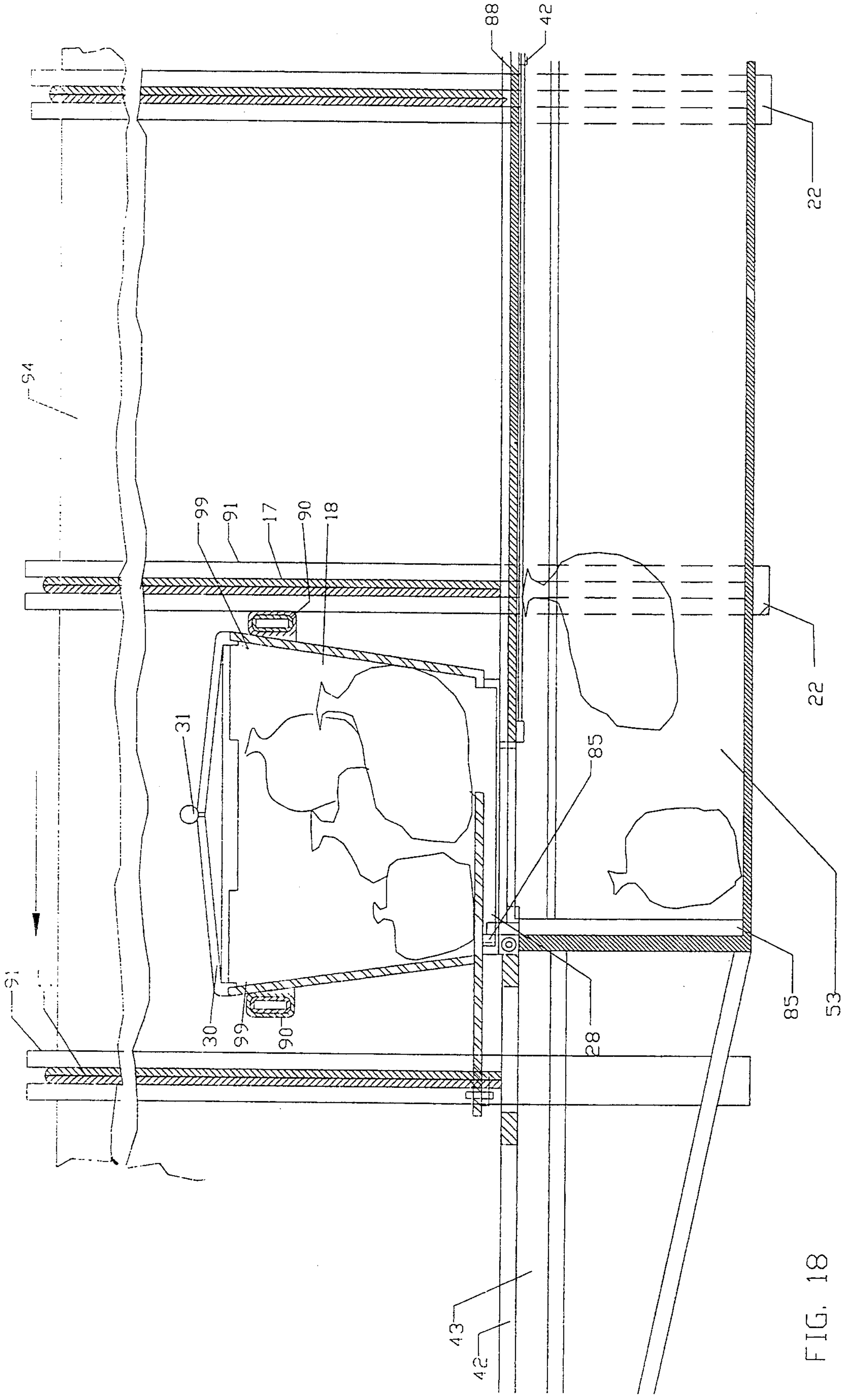
FIG. 18 is a side view of the can along side the truck. The bottom slide plate of the can and top slide plate of the collection device have both opened. Garbage is falling into the collection device.

FIG. 18 is a side view of the can (18) alongside the truck (94) with the bottom plate openers (10) having engaged the targets (85) under the can (18). The bottom slide plate (11) is being opened and the spring inside of the pneumatic cylinder (28) is being compressed. The torsion spring (103) holding the bottom plate openers (10) upright is under tension. The top slide plate (88) of collection device (53) has been opened by hydraulic cylinder #1 (42). Garbage is falling from the can (18) into the collection device (53). As the refuse falls from the bottom of the opened can (18), the truck (94) continues to move forward at a fixed speed carrying the collection device (53). A delay switch keeps the top slide plate (88) of the collection device (53) in the open position for a fixed period of time before hydraulic cylinder #1 (42) forces it to close.

Figures 19, 20, 21:
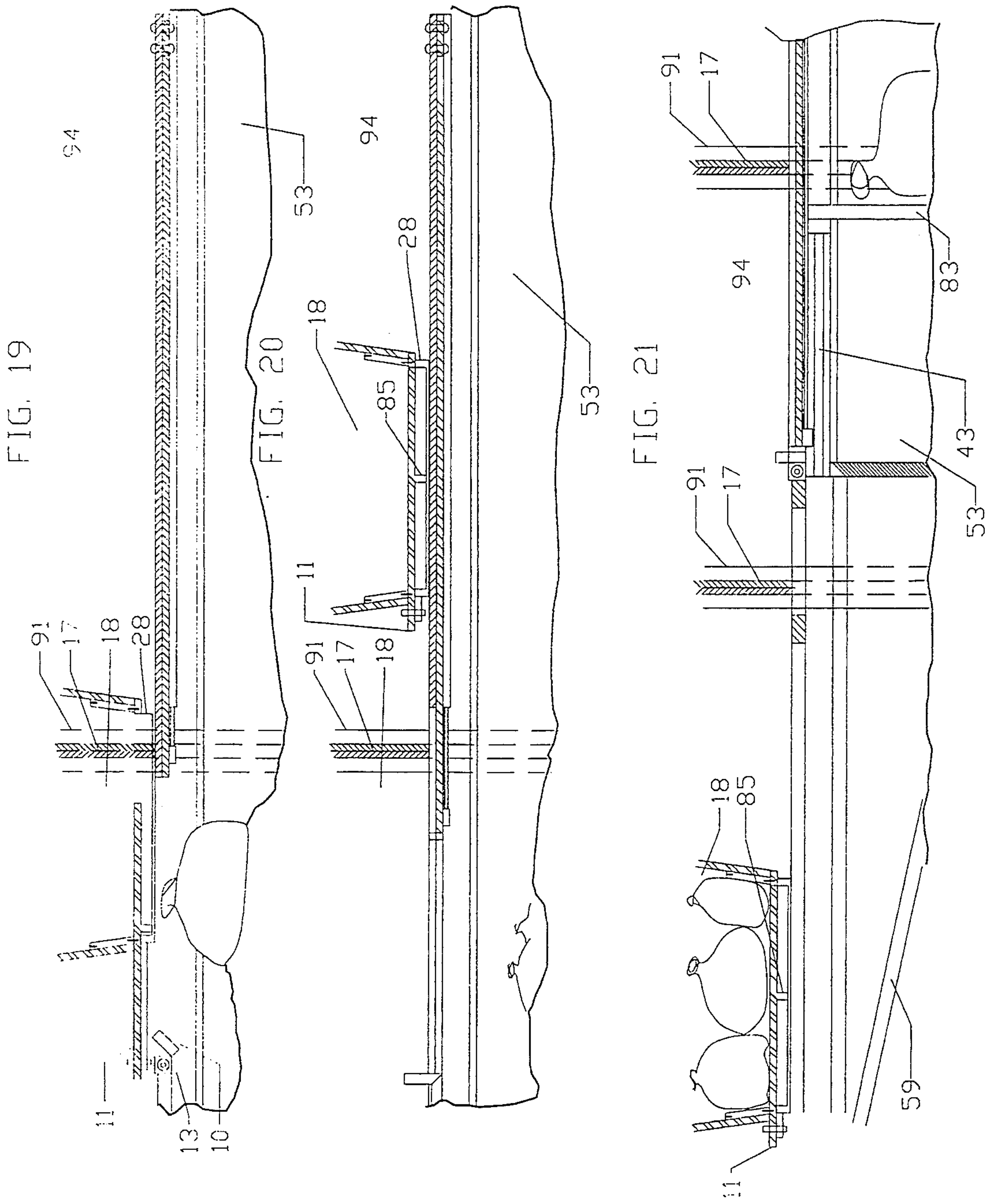
FIG. 19 is a side view of the can's bottom slide plate fully extended and door openers leaning over and disengaging from the targets.
FIG. 20 is a side view the CDs top slide plate closing.
FIG. 21 is a side view of the top slide plate which is now closed. The hydraulic cylinder connected to the sweeper is pushing the trash. The next can is being approached.

FIG. 19 is the side view of the can (18) and the collection device (53). The can's targets (85) and the torsion springs (103) have disengaged and the bottom plate openers (10) are returning to their upright position. Now that the targets (85) have disengaged, the can's spring in the pneumatic cylinder (28) begin to return to its extended position and is pushing against bottom slide plate (11) which is now closing. A delay switch keeps the top slide plate (88) in its opened position.

FIG. 20 shows a side view of the side of the can (18). The bottom slide plate (11) has closed. The garbage has fallen into the collection device (53). The collection device (53) is still passing under the can (18), the bottom slide plate (11) has been closed by the can's pneumatic cylinder (28), the delay switch has activated hydraulic cylinder #1 (42) sliding the top slide plate (88) to its closed position.

FIG. 21 is a side view of the can (18) and the top of the collection device (53). In this figure, the collection device's top slide plate (88) has closed. The CD sweeper (83) is a flat rectangular plate with a rectangular cut-out (32) in its middle to allow its passage on both sides of the CD divider (21) in the collection device (53). The CD sweeper (83) is attached to hydraulic cylinder #2 (43). Hydraulic cylinder #2 (43) has been activated pushing the CD sweeper (83) and the trash that was deposited in the collection device (53), backward to quadrant #2 (63) of the pan (52) located at the end of the collection device (53).

The circuit for hydraulic cylinder #2 (43) has the following components: hydraulic cylinder #2 (43), a limit switch (49), CD sweeper (83), two channels (23) and a sink. A sink is mounted under the chassis of the truck (94).

When electric current is turned on:

a. a limit switch (49) is activated,
b. hydraulic cylinder #2 (43) extends from the front of the collection device (53) to its rear. As it does, it pushes the CD sweeper (83) along channels (23),
c. when hydraulic cylinder #2 (43) is fully extended, the CD sweeper (83) reaches the rear of the CD and the limit switch (49) is turned off,
d. the hydraulic cylinder #2 (43) retracts to its original position. This completes the cycle.

The collection device (53) is ready to encounter the next can (18) which is shown above the projecting guide (59) with its bottom slide plate (11) in the closed position.

Figure 22:
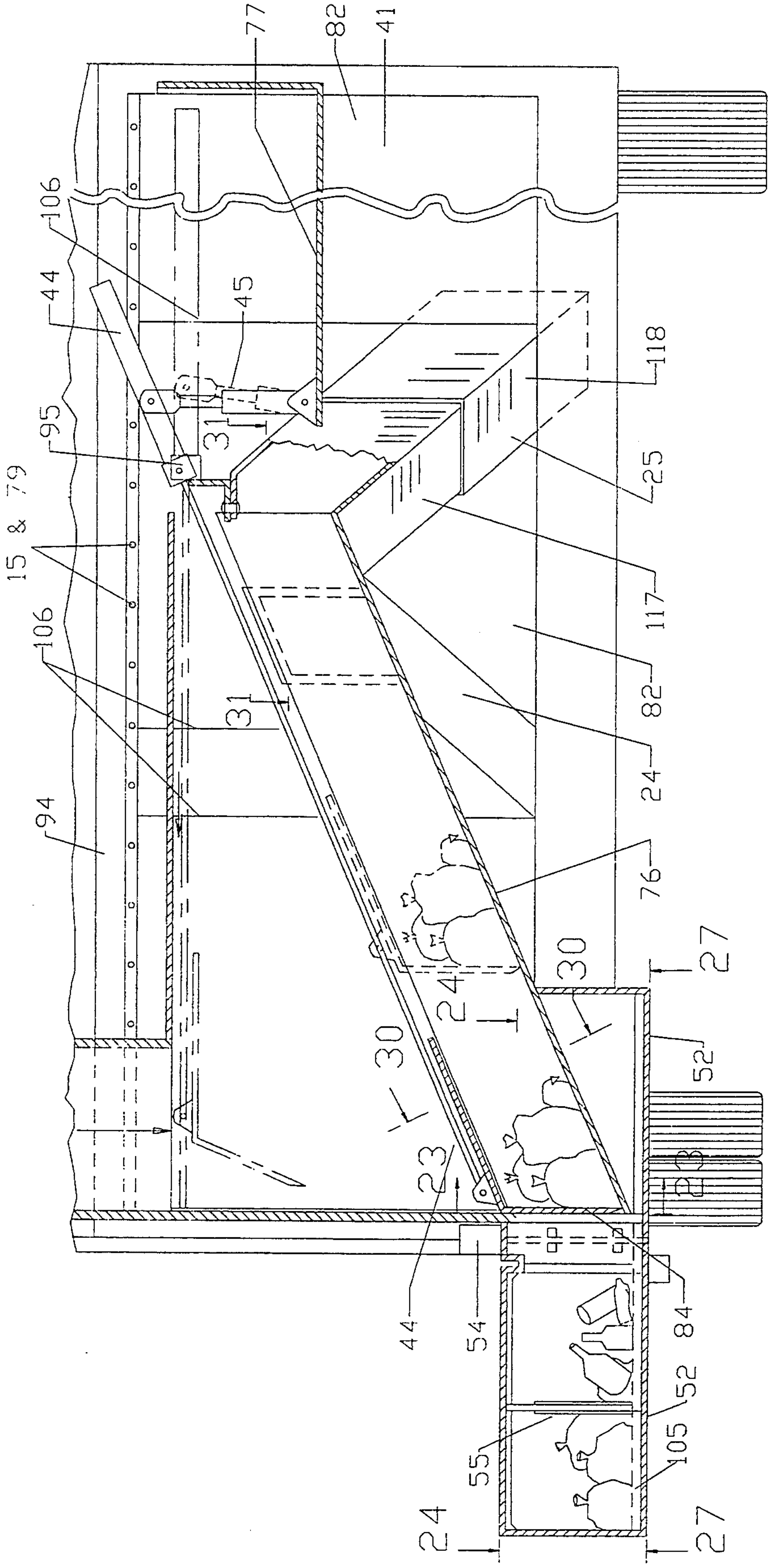
FIG. 22 is a cross section of the back of the truck, collection device, sweeper arm, sweeper arm motor, secondary conveyor, hydraulic system, chutes and the universal hopper enclosure.

FIG. 22 is a cross-section along the back of the truck (94) showing the pan (52), the sweeper arm motor (54), the sweeper arm (105), pan divider (55), the inclined secondary conveyor (76), the SC sweeper (84), Hydraulic cylinders #3 (44) and #4 (45), the chute assembly comprising chutes #1 (24) and #2 (25) and the universal hopper enclosure (82).

The collection device (53) is being supported on the side of the garbage truck (94). Garbage is seen coming through the collection device (55) and quadrant #2 (63) of the pan (52) on both sides of the pan divider (55). The motor (51) for the sweeper arm (105) can be seen above the top of the collection device (53). The secondary conveyor (76) is mounted parallel to the back of the truck (94) on an incline so that when the SC sweeper (84) moves from its beginning to the end of its SC divider (74) (see FIGS. 30 and 51), it pulls the garbage backward and upwards at the same time. The SC sweeper (84) pulls the garbage while verticle to the ground but because of the upward slope of the conveyor, it is at an angle to the top and bottom of the secondary conveyor (76). At the outermost corners of the secondary conveyor (76), its bottom is cut away in two arcs (see FIG. 31). It is along these arcs that the secondary conveyor (76) is attached to the chute assembly (24) and (25). Along the edge of the secondary conveyor (76) and adjacent to each corner of the top and bottom of the secondary conveyor (76) are holes through which rivets are inserted for attachment of chutes #1 (24) and #2 (25). The secondary conveyor (76) has flexible connectors (36) that attach its sides to the sides of the chutes (24 and 25). The SC sweeper (84) has a cut-out (32) (see FIG. 30) in its middle to allow it to pass on both sides of the SC divider (74). The SC sweeper (84) is attached to the end of hydraulic cylinder #3 (44) and moves by the coordinated force exerted by hydraulic cylinders #3 (44) and #4 (45).

Hydraulic cylinders #3 (44) and #4 (45) are mounted as follows: hydraulic cylinder #3 (44) is mounted above the secondary conveyor and parallel to its top surface. It is attached to a focrum (95) and to hydraulic cylinder #4 (45). Hydraulic #4 (45) is mounted vertically and is attached to hydraulic cylinder #3 (44) and to a focrum on a base (77) which allow some lateral movement. The circuit for Hydraulic cylinders #3 (44) and#4 (45) has the following components: Hydraulic cylinders #3 (44) and #4 (45), SC sweeper (84), a focrum (95) for each hydraulic cylinder, a delay switch, channels (23) and a sink. The sink (100) is mounted under the chassis of the truck (94).

When the electricity is turned on, hydraulic cylinder #3 (44) contracts and pulls the SC sweeper (84) on rollers (70B) along channels (23), (see FIG. 30) from the the front of the secondary conveyor (76) to the rear of the SC divider (74). The motion of the SC sweeper (84), moves the garbage from the place where the garbage had been moved by the sweeper arm (105) at the front of the secondary conveyor (76), to the chutes #1 (24) and #2 (25) at the rear of the secondary conveyor (76). As the SC sweeper (84) reaches chutes #1 (24) and #2 (25), a delay switch (102) holds the SC Sweeper in position. A sensor is activated. Hydraulic cylinder #4 (45) then contracts and pulls vertically against the side of hydraulic cylinder #3 (44) causing it to turn on its focrum (95) and moves the SC sweeper (84) upward. The delay switch (102) turns off. Hydraulic cylinder #3 (44) extends and it does so, hydraulic cylinder #4 (45) extends lowering the SC sweeper (84) completing the cycle.

The chute assembly is made up of two chutes #1 (24) and #2 (25) and flexible connectors (36). Chute #1 (24) is a fixed size. Chute #2 (25) is made of sections #1 (117) and #2 (118), The dimensions of section #1 (117) are slightly smaller than those of section #2 (118) and section #1 (117) may slide into section #2 (118) so that the overall length of the chute #2 (25) can be varied (see FIG. 31).

The universal hopper enclosure (82) is made of a non-porous, opaque material. The enclosure (82) is cut into vertical strips (106). The top of the enclosure (82) has snaps (79) and corresponding buttons (15) are embedded along the top of the frame of the truck's hopper (41). Sections are unrolled downward from the top of the hopper (41) until they reach either the top of one of the chutes #1 (24) and #2 (25) or the bottom of the hopper (41) where they are secured. Rollers extend across the bottom of the material.

Figure 23:
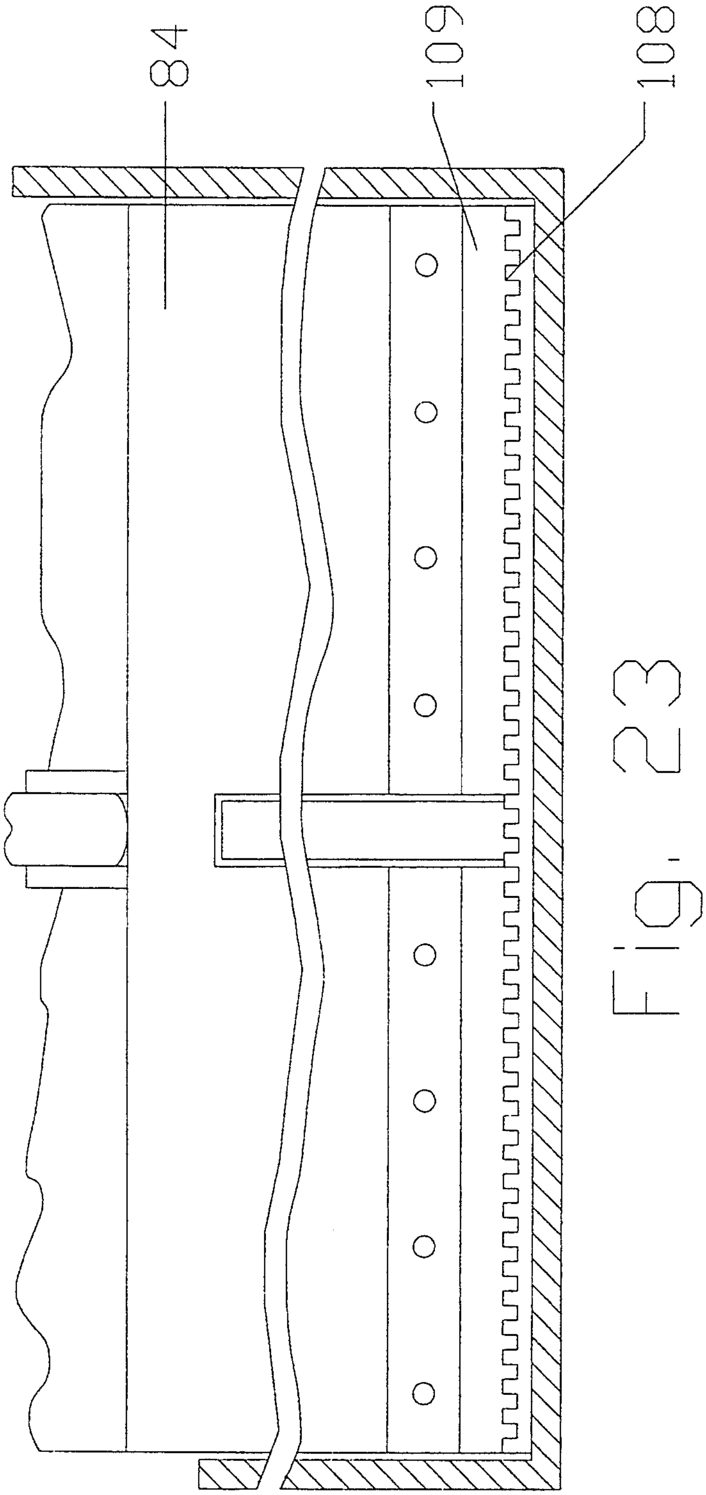
FIG. 23 is a front view of the sweeper arm.

FIG. 23 is the front view of the SC sweeper (84) along its bottom. The SC sweeper (84) has a broom (109) and teeth (108) attached along its bottom. The SC sweeper and the CD sweeper have the same design. As the SC sweeper (84) begins to be pulled backward and upward within the secondary conveyer (76) its broom (109) moves through a comb sweeping the smaller sized pieces of refuse in front of it.

Figure 24:
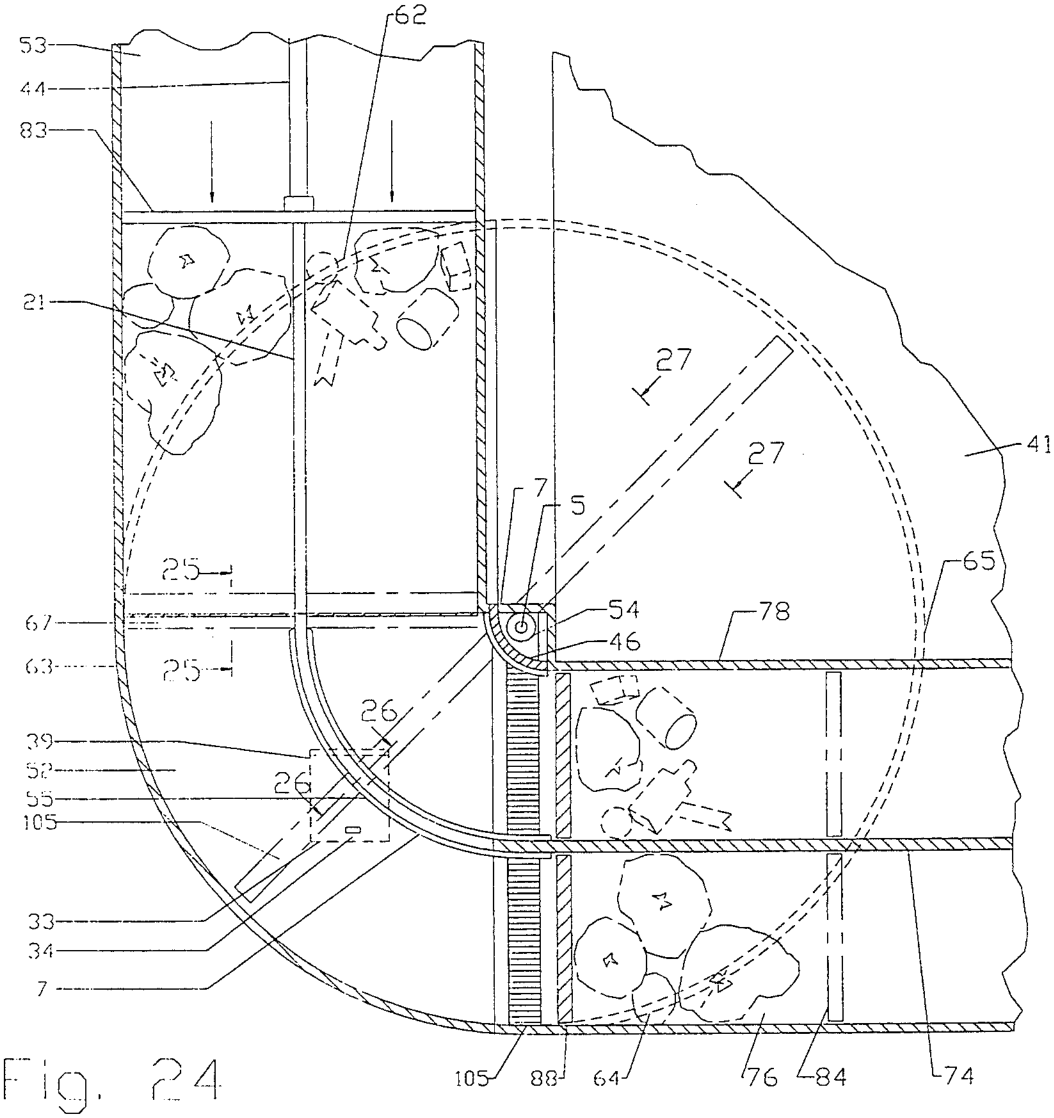
FIG. 24 is a top view of the collection device, the pan, CD divider, pan divider, SC secondary collector, hereafter called SC divider, the flexible barrier, the pan, the pan divider, sweeper arm, sweeper arm motor, comb and the secondary conveyer.

FIG. 24 is a top cross section showing the collection device (53), hydraulic cylinder #2 (43) which is above the CD divider (21), the CD sweeper (83), restrictive gate (67) between the collection device (53) and quadrant #2 (63) of the cylindrical pan (52), quadrant #2 (63), pan divider (55), sweeper arm (105), inner wall (46), the motor (54), the secondary conveyer (76), SC sweeper (84) hydraulic cylinder #3 (44) which is above the SC divider (74).

The pan (52) has the shape of a flattened hollow cylinder divided along its diameter. It is closed top and bottom and has an outer wall (107) around its circumference. Inside it is divided, top to bottom, by a round member called a pan divider (55). There is an inner wall (46) surrounding its axis (5). A powered sweeper arm (105) turns around the axis (5) within the pan (52).

The pan (52) has four quadrants. Beginning underneath the collection device (53) at the back of the collection device (53) and adjacent to the edge that is along the body of the truck (94), is the start of quadrant #1 (62). The quadrant (62) terminates at a restrictive gate (67) under the far end of the collection device (53). At that point is a restrictive gate (67) that provides a place through which the sweeper arm enters quadrant #2 (63). Quadrant #2 (63) begins at the far edge of the collection device (53) and terminates where it abuts with the secondary conveyor (76). Quadrant #3 (64) begins at the front edge of the secondary conveyor (76) and is below the secondary conveyor (76). It terminates at the point where it extends beneath the back of the truck. Quadrant #4 (65) begins beneath the truck's hopper (41) and terminates under the side of the truck (94) completing its circular shape. Quadrants #1 (62) and #2 (63) are attached to one another and to the collection device (53). Quadrants #1 (62) and #2 (63) can be lifted to the top of the truck (94) along with the collection device (53) and its projecting guide (59) when the truck (94) is not collecting refuse. Quadrants #3 (64) and #4 (65) are attached to the truck and are also attached to one another.

Above quadrant #2 (63), and comprising a part of quadrant #2, are two concentric sections each divided vertically. The sides and top are attached to and form extensions of the collection device (53). The sweeper arm (105) turns 90 degrees within quadrant #1 and exits the quadrant as it pushes up a restrictive gate (67) (see FIG. 26). It emerges in quadrant #2 (63) where it pushes garbage that has been pushed onto the pan (52). The motion of the sweeper arm (105) turns the garbage on both sides of the pan divider (55). As it turns, it raises flexible barriers (7) beneath the pan's inner wall (46) and beneath the pan's divider (55) (see FIG. 26). The walls, sides and top of the quadrant #2 (63) enclose the garbage. Quadrant #2 has a door (33) on the top with hinges (39) and a handle (34) (see FIG. 24).

A motor (54) and the axis (52) of the sweeper arm (105) are located behind the rear corner of the truck (94) above quadrant #3 (64) (see FIG. 22). There is a sprocket (not shown) attached to the axle. Around the sprocket (110) is roller chain (111) which goes around the shaft of the motor (54).

From the end of the collection device (53) the sweeper arm's (105) movement turns the garbage 90 degrees to the secondary conveyor (76). The bottom of the sweeper arm (105) has teeth. The sweeper arm (105) passes through a comb (26) (See FIG. 25) on the front of the secondary conveyor (76). Small particles may remain in the part of the pan (52) (See FIG. 22) that is beneath the secondary conveyor (76).

On the outside side surface of the pan (52) caution reflectors (20) (see FIG. 1) are attached. On the outside back surface of the secondary conveyor (76) are both caution reflectors (20) and brake lights (13) which lights are wired to the brake of the truck (94).

Figure 25:
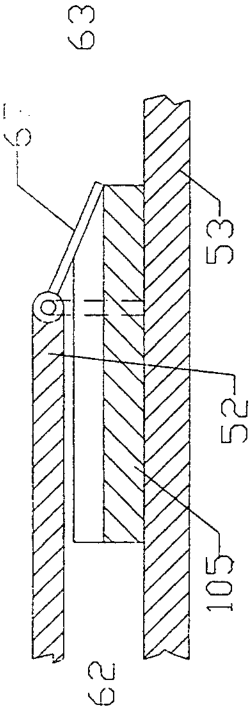
FIG. 25 is a side view of the bottom of the collection device, restrictive gate, sweeper arm and the pan.

FIG. 25 is a side view of the sweeper arm (105) raising the restrictive gate (67) and leaving quadrant #1 (62) of the pan (52). The restrictive gate (67) is attached to the bottom of the collection device (53). It is seen entering quadrant #2 (63) of the pan (55). The sweeper arm (105) is being turned on an axis (5) by a power source (54).

Figure 26:
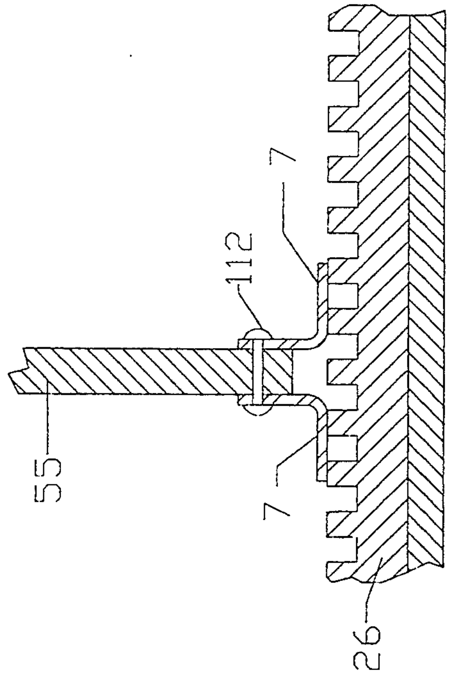
FIG. 26 is a side view of the pan divider, flexible barrier and comb.

FIG. 26 is a representation of the bottom edges of the pan divider (55) in the quadrant #2 (63) and the inner wall of the pan (52). Flexible barrier (7) hang from both sides of the two members. This figure also shows the pan divider (55) and it shows the secondary conveyor's comb (26). The flexible barriers (7) are hung from rivets (112). The sweeper arm (105) moves pushing the flexible barriers (7) upward as the barrier (7) is encountered. As the sweeper arm (105) passes the flexible barriers (7), the flexible barriers (7) returns to their original positions.

Figure 27:
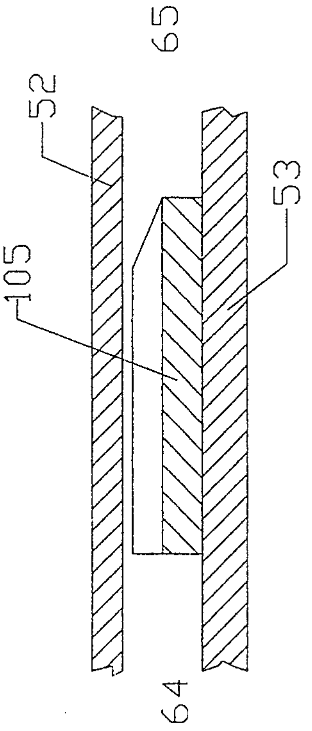
FIG. 27 is a side view of the sweeper arm in its pan.

FIG. 27 shows top and bottom of the pan (52) and the sweeper arm (105) in quarants #3 (64) and #4 (65) of the pan (52).

Figure 28:
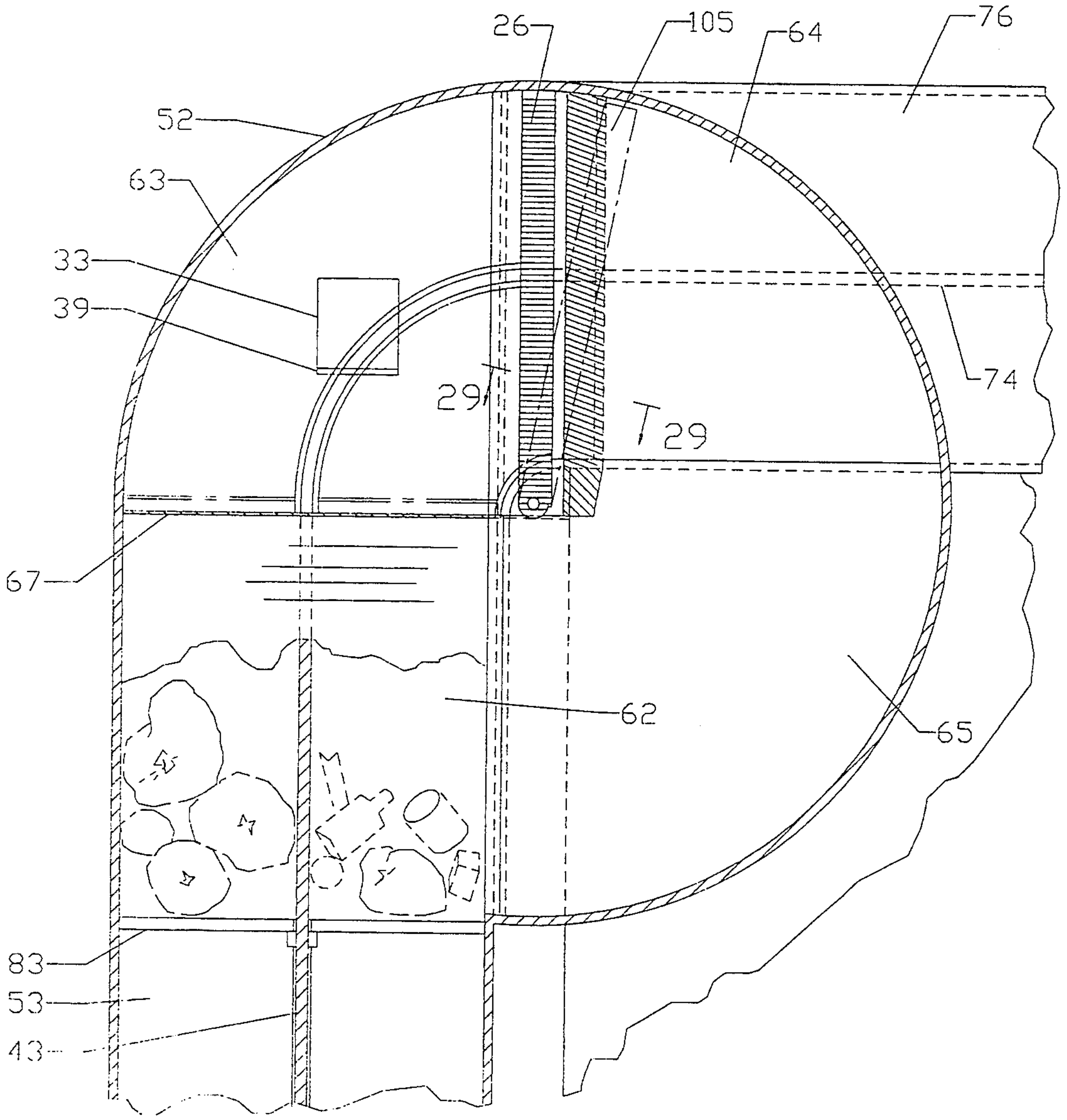
FIG. 28 is a bottom view from under the collection device, pan and secondary conveying device.

FIG. 28 is a view looking upward from under the collection device (53). The restrictive gate (67), sweeper arm (105), quadrants #1 (62), #2 (63), #3 (84) and #4 (65), the comb (26) and secondary conveyor (76) can be seen. The garbage is being pushed by hydraulic cylinder #2 (43) and the attached CD sweeper (83) toward the restrictive gate (67) and toward quadrant #2 (63) of the pan (52).

Figure 29:
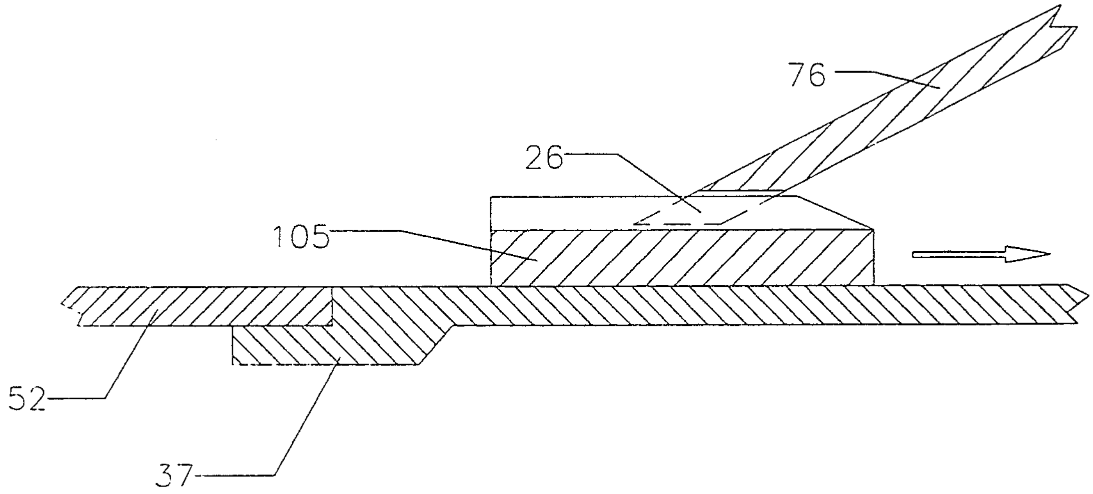
FIG. 29 is a side view of the sweeper arm moving through the comb at the beginning of the SC.

FIG. 29 is a side view of the sweeper arm (105) moving through the comb (26) at the front edge of the inclined secondary conveyor (76). The sweeper arm (105) revolves around its axis (5) under the secondary conveyor (76). The SC pan support (37) is attached to the secondary conveyor and extends beneath the pan (52) and gives the pan (52) support.

Figure 30:
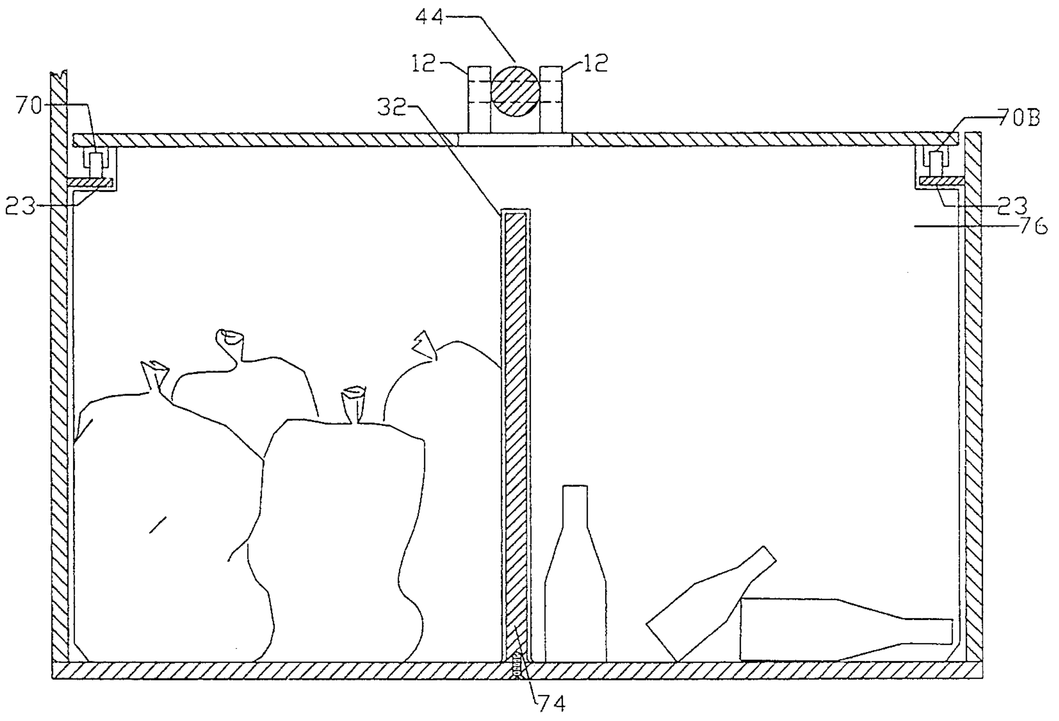
FIG. 30 is an end view of SC. Refuse is moving on both sides of the SC divider and is being pushed by the SC sweeper.

FIG. 30 is an end view of the SC sweeper (84) moving through the secondary convyeor (76) pushing garbage in front of it. The SC sweeper (84) is on rollers (70) in channels (23) on top of the walls of the secondary conveyor (76). The SC divider (74), the SC sweeper (84) and hydraulic cylinder #3 (44) can be seen.

Figure 31:
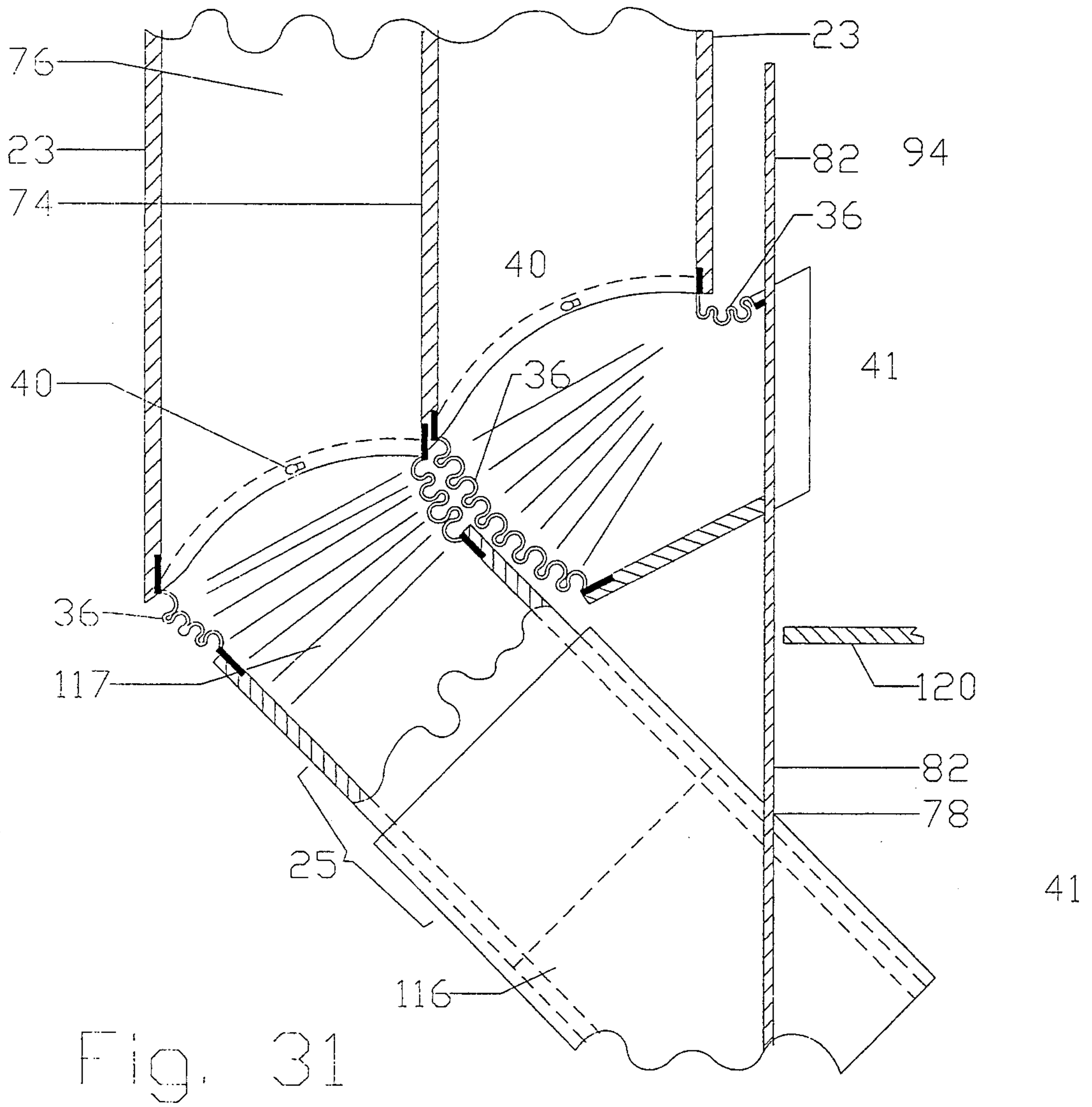
FIG. 31 is a top view of the SC, chutes #1, both sections of chute #2, flexible connectors, universal hopper enclosure and the truck hopper.

FIG. 31 is a top view of the secondary conveyor (76), the channels (23) on top of the walls of the secondary conveyor (76), the SC divider (74), chutes #1 (24) and #2 (25), the flexible connectors (36), the universal hopper enclosure (82), the edge of the garbage's truck's hopper (41), and the truck's hopper divider (120).

Both chute #1 (24) and #2 (25) are attached to the secondary conveyor (76) on their front ends and they extend through the universal hopper enclosure (82) where they rest on, and are attached, to the bottom lip (78) (see FIG. 24) of the truck's hopper (41). Chutes #1 (24) and #2 (25) may be welded to the hopper (41) of the truck or bolted in place.

Adjacent to the edge of the secondary conveyor (76) and near each corner of the top and bottom of the secondary conveyor (76) are holes. Corresponding holes are in the top and bottom of chute #1 (24). The parts may be riveted together or bolts can be slipped through each hole and secured with hardened washers and lock nuts to attach chute #1 (24) to the secondary conveyor (76).

Chutes #1 (24) and #2 (25) rest on the hopper's lower lip (78) and may be welded to it. If the chutes #1 (24) and #2 (25) are not to be welded to the lip (78), then, at the bottom edge of chutes #1 (24) and #2 (25) adjacent to the truck (94), two "U" shaped shackles (not shown)

are attached. These are wide enough to fit on the lip (78) of the hopper (41) of any garbage truck. A hole is drilled through each of the shackles (113). A corresponding hole is drilled through the lower lip (78) of the hopper (41). A bolt is passed through the holes and secured with a hardened washer (114) and lock nut (115) to attach chutes #1 (24) and #2 (25) to the lower lip (78) of the hopper (41).

Chute #1 (24) is a fixed length because the secondary conveyor (76) is always a fixed distance from the truck's hopper (41).

Chute #2 (25) is made up of two sections (117) and (118). The smaller section (117) is attached to the secondary conveyor (76) and a larger section (118) is connected to the smaller section (117) on one side and projects to the truck hopper (41) on the other. The smaller section (117) can slide into the larger section (118) so as to change the total length of chute #2 (25). This enables chute #2 (25) to be extended to reach the far side of a divided hopper.

The top and bottom edges of chutes #1 (24) and #2 (25) adjacent to the secondary conveyor (76), are rounded and fit into corresponding rounded top and bottom edges on the secondary conveyor (76). Attached to the sides of chute #1 (24) and to each of the sides of the smaller section (117) are flexible connectors (36) that allow the angles of chutes #1 (24) and #2 (25) to be varied in relation to the secondary conveyor (76) should the chutes (24) and (25) be turned. Near the edge of the secondary conveyor (76), in the middle of the top and in the middle of the bottom of the edges of chutes #1 (24) and #2 (25) adjacent to the secondary conveyor (76), are holes with a square cut out on the top of the holes making them look like key holes. A clevis pin key with a spring is slipped through each hole and turned to attach chutes #1 (24) and #2 (25) to the secondary conveyor (76). Together the pin and the flexible connectors (36) allow the chutes (24) and (25) to be turned.

The top, bottom and sides of the section #1 (117) of chute #1 (24) are smaller than the corresponding parts of section #2 (118) of chute #2 (25). Section #1 (117) adjacent to the secondary conveyor (76). The difference in size between the sections allows the smaller section (117) to slide inside the larger section (118) making it possible for the total length chute #2 (25) to be expanded and contracted according to the width of the truck hopper (41) to which it is attached. Both the sections (117) and (118) have rows of holes on each side. As chute #2 (25) is set in its desired length, a "T" Quick Release Pin is slipped through holes on each side of chute #2 (25) to set its total length.

Together the "T" Quick Release Pins (116) and sections #1 (117) and #2 (118), make it possible for the chute #2 (25) to be used on any garbage truck regardless of the width of its hopper.

The bottom edge of chute #2 (25) may be welded to a garbage truck (94). As an alternative two "U" shaped pins may be attached to the bottom edge of chute #2 (25). These are wide enough to fit on the lip (78) of the hopper (41) of any garbage truck. Chutes #1 (24) and #2 (25) rest on the hopper's (41) lower lip (78). A corresponding hole is drilled through the edge of the lower lip (78) of the hopper (41). A bolt is passed through the holes and secured with a washer and lock nut to attach chutes #1 (24) and #2 (25) to the lower lip (78) of the hopper (41).

As garbage is pushed to the rear of the secondary conveyor (76), the garbage slides downward through the chutes #1 (24) and #2 (25), past the universal hopper enclosure (82) and then into the proper part of the truck's hopper (41). Chutes #1 (24) and #2 (25) and the universal hopper enclosure (82) fit back-loading garbage trucks (94) with or without divided hoppers (41) and they fit the hoppers (41) of trucks (94) regardless of the hopper size. The universal hopper enclosure (82) insures that both the refuse and its odors are contained and that once the garbage has been collected, it is no longer seen.

There are no known collection systems in existence that make it possible for a moving vehicle to collect garbage or other materials from a stationary container.

The garbage can which is the subject of this invention is unique in several respects. Of the known garbage cans, all must be uncovered before emptying, all must be lifted to be emptied, all must be returned to the ground and all must be recovered after having been emptied. All must be emptied from their tops. No existing garbage can has devices that makes it possible for lateral alignment with a moving collection device before the garbage is collected, or has an anchoring device implanted in a road surface to prevent the garbage can from being moved or tipped over. None have anchor keys to lock the garbage cans in place. None have anchoring devices that may be located at the side of a home. None can be moved into lateral and verticle alignment with a collection device mounted on a garbage truck and none can be moved into lateral and verticle alignment with a collection device mounted on a garbage truck while the truck is moving. None are quiet while being emptied, none allow the garbage to be collected from a garbage truck that is moving and none automatically return to its original position after being emptied. The garbage can which is the subject of this invention has all of these features.

There are no known chute assemblies and/or universal hopper enclosures that direct garbage into truck hoppers of different sizes. There are no such devices that direct collected material to specific parts of the hopper. There are no known enclosers that fit different size hoppers.

While the principal use of the components described in this invention is for the storage and collection of garbage, there are other new and novel uses for the system. The same system and its components may also be used for the storage, collection and handling other materials that might be deposited in a container and left for collection. Experiments show that the system and the garbage can, may and will be easily adopted for the collection of mail. The system will be adapted to both the home and free standing mail deposit locations. The can, when used as a free standing mail deposit, needs modifications as to its size and a modified cover to keep mail secure while awaiting the arrival of a moving mail collection vehicle or mail delivery vehicle. The movement of the mail within the collection device, the pan and the secondary conveyor and the sweepers, require only slight modifications. The system may also be used with modifications as to size and the positioning of the collection device, to enable the system to be used by side loading collection vehicles, collection of industrial refuse, commercial refuse and refuse from multi-family residential complexes. Modifications incorporating the system within a specially designed truck is another new and novel use of the system described in the present invention.

Now that the invention has been described, what I claim is:

1. A refuse collection system comprising:

a. at least one garbage can having an openable and closable top member and an openable and closable bottom member which can is filled from its top and emptied from its bottom and said can having a removable divider member which, when in place, serves to separate two kinds of garbage;

b. a mobile supporter having track members which support said can, in a cantilevered manner, perpendicularly to a curb or a side of a road;

c. anchoring members to attach said mobile supporter to an in-ground anchor means for securing said mobile supporter;

d. a collection vehicle with a hopper and a vertically movable collection means mounted thereon for opening said can while mounted on said mobile supporter, said collection means having a first power means to move material from a collection area toward a rear of said vehicle, a second power means attached to a rear of said collection means for turning said material, a conveying means for moving material to said hopper mounted on said vehicle and abuting said turning means, said conveying means having a power means to move material through said conveying means to chutes attached to said conveying means, which chutes are variable in length and are attached to said hopper; and e. a guide means that aligns said collection means and said can both horizontally and vertically and maintains said alignment while said bottom member is opened.

2. A refuse collection system as claimed in claim 1 wherein said can comprises:

a. members to engage said collection means to open said bottom member;

b. a power means for closing said bottom member;

c. a guide member to laterally align said can with said collection means and maintain said alignment while said can and said collection means are in contact with one another;

d. a power means for laterally moving said can to its original position after said can and said collection means are no longer in contact with one another;

e. said engaging members, said power means for closing said bottom member, said guide members and said power means for laterally moving said can make it unnecessary for said can to be uncovered, lifted or moved from said mobile supporter to be emptied and make it unnecessary for said can to be set back on the ground and recovered after being emptied to make it unnecessary for said truck to stop to empty said can.

3. A refuse collection system as claimed in claim 1 wherein said mobile supporter comprises:

a. members to mount said can in a cantilevered manner and move said supporter with said mounted can;

b. a means to horizontally move said can while said supporter is engaged with said anchor means;

c. a means to vertically move said can while said supporter is engaged with said anchor means;

d. a guide member to vertically align said can with said collection means while said can is mounted on said supporter and while said supporter is engaged with said anchor means;

e. a means to maintain horizontal and vertical alignment with said collection means while said can and collection means are engaged with one another; and f. said support members, said anchoring members, said means for vertical movement, said guide member, said means for maintaining alignment with said collection means, enable said can to be emptied into said collecting means while said collection means is in motion without said can being removed from said supporter.

4. A refuse collection system as claimed in claim 1 wherein said anchoring members comprise:

a. mountings on said supporter;

b. a power means to maintain said anchoring members in an upright position; and c. members that eject debris from under a bridging member of said anchor means.

5. A refuse collection system as claimed in claim 1 wherein said anchor means comprises:

a. housings for insertion into the ground or road surface;

b. a bridging member between said housings below the ground or road surface under which said anchoring members may be inserted.

6. A refuse collection system as claimed in claim 1 wherein said collection means comprises:

a. mounting members and track members for attachment to said collecting vehicle and to provide for vertical movement;

b. guide members to laterally and vertically align said can and said supporter with said collection means;

c. members for engaging and exerting a force on said bottom member of said can;

d. a means for exerting a force against said bottom member of said can, to move said bottom member to its opened position;

e. an openable and closable top member;

f. a power means to open and close said top member;

g. members enclosing the collection means;

h. a lengthwise dividing member to maintain a division of materials collected from said can;

i. said first power means including a ram with its rear plate extending across the width and height of said collection means, stradling said dividing member and a power means for moving said ram and material in the collection area from said collection area to the rear of said collection means;

j. openable and closable members to provide access to the inside of said collection means;

k. a curved means attached to the rear of said collection means, enclosing a sweeping member;

l. a lengthwise curved dividing member within said curved means;

m. said sweeping member stradling said curved dividing member;

n. a member under said curved divider that permits the passage of said sweeping member but not the materials being moved; and o. caution reflectors affixed to the outside of said collection means and to said curved means.

7. A refuse collection system as claimed in claim 6 wherein said conveying means comprises:

a. mounting members for attachment to said collecting vehicle;

b. members enclosing said conveying means abutting said curved means;

c. a lengthwise dividing member abutting said curved dividing member, to maintain a division of materials collected from said can;

d. a plate member extending across a width and height of said conveying means stradling said dividing member;

e. a funnel means to catch debris falling from said curved divided means, when lifted and turned on its side; and f. caution reflectors and brake lights affixed to the outside of said conveyer means.

8. A refuse collection system as claimed in claim 1 wherein said collection vehicle comprises a means for enclosing a portion of said chutes and/or said hopper and the materials and odors eminating therefrom.

9. A refuse collection system as claimed in claim 1 wherein said refuse collection vehicle comprises:

a. a means to raise and lower said collection means;

b. members for attaching said conveying means and a debris collection means;

c. an attached debris collection means;

d. members for attaching brake lights to said conveying means; and e. wherein said refuse collection vehicle may simultaneously collect more than one type material from specified locations while the vehicle is in motion.

* * * * *